US012725110B2

(12) United States Patent
Rowley et al.

(10) Patent No.: US 12,725,110 B2
(45) Date of Patent: Sep. 1, 2026

(54) METHOD AND SYSTEM FOR DYNAMIC SKILLS ASSESSMENT

(71) Applicant: Performa Learning, Inc., San Diego, CA (US)

(72) Inventors: Danielle Rowley, San Diego, CA (US); Mark A. Wells, San Diego, CA (US)

(73) Assignee: Performa Learning, Inc., San Diego, CA (US)

( * ) Notice: Subject to any disclaimer, the term of this patent is extended or adjusted under 35 U.S.C. 154(b) by 31 days.

(21) Appl. No.: 18/924,054

(22) Filed: Oct. 23, 2024

(65) Prior Publication Data

US 2025/0045681 A1 Feb. 6, 2025

Related U.S. Application Data

(60) Provisional application No. 63/592,636, filed on Oct. 24, 2023.

(51) Int. Cl.

| | |
|---|---|
| ***G06Q 10/0639*** | (2023.01) |
| ***G06F 16/23*** | (2019.01) |
| ***G06Q 10/0631*** | (2023.01) |

(52) U.S. Cl.

CPC ....... *G06Q 10/06398* (2013.01); *G06F 16/23* (2019.01); *G06Q 10/063112* (2013.01); *G06Q 10/0639* (2013.01); *G06Q 10/06393* (2013.01); *G06Q 10/06395* (2013.01)

(58) Field of Classification Search

CPC ..... G06Q 10/06398; G06Q 10/063112; G06Q 10/0639; G06Q 10/06393; G06Q 10/06395; G06F 16/23

See application file for complete search history.

(56) References Cited

U.S. PATENT DOCUMENTS

| | | | |
|---|---|---|---|
| 7,113,266 | B1 | 9/2006 | Wells |
| 8,339,585 | B2 | 12/2012 | Wells |
| 8,463,765 | B2 | 6/2013 | Lesavich |
| 8,671,143 | B2 | 3/2014 | Lewis |

(Continued)

FOREIGN PATENT DOCUMENTS

AU 2016206269 A1 * 2/2017

OTHER PUBLICATIONS

Dr. John Whittman, *The Forgetting Curve*, California State University (CSU), Stanislas, California, Aug. 30, 2017.

*Primary Examiner* — Charles Guiliano

(74) *Attorney, Agent, or Firm* — Lesavich High-Tech Law Group, S.C.; Stephen Lesavich

(57) ABSTRACT

A method and system for dynamic skills assessment. Digital indicators are used with dynamic skill assessment indicators to indicate plurals type of skill sets assessed, plural levels of skill sets completed, plural expiration times and dates for the plurals type of skill set assessment completed and plurals levels of skill assessment completed, plural unique identifiers for plural users who completed the plural skill set assessments and plural identifiers for plural network devices on which the plurals skill sets were assessed for the plural users. The dynamic skill assessment indicators include plural different indicators including graphical, audio, video, text and/or haptic dynamic skill assessment indicators that dynamically are changed to different colors, shapes, sizes, sounds, videos, feelings, etc., when new skills sets are achieved and when existing skill sets expire.

22 Claims, 15 Drawing Sheets

(56) References Cited

U.S. PATENT DOCUMENTS

| | | | | |
|---|---|---|---|---|
| 9,037,564 | B2 | 5/2015 | Lesavich et al. | |
| 9,137,250 | B2 | 9/2015 | Lesavich et al. | |
| 9,361,479 | B2 | 6/2016 | Lesavich et al. | |
| 9,569,771 | B2 | 2/2017 | Lesavich et al. | |
| 10,466,165 | B2 | 11/2019 | Graham et al. | |
| 10,510,193 | B2 | 12/2019 | Wells et al. | |
| 10,755,296 | B2 | 8/2020 | Teevan | |
| 10,796,317 | B2 | 10/2020 | Wells | |
| 11,380,216 | B1 | 7/2022 | Balan | |
| 11,423,417 | B2 | 8/2022 | Wells | |
| 11,482,057 | B2 | 10/2022 | Wells | |
| 11,587,190 | B1 * | 2/2023 | Frischmann | G09B 7/06 |
| 11,632,255 | B2 | 4/2023 | Vesteman | |
| 2011/0208710 | A1 | 8/2011 | Lesavich | |
| 2012/0075630 | A1 | 3/2012 | Wells | |
| 2012/0278622 | A1 | 11/2012 | Lesavich et al. | |
| 2014/0156750 | A1 | 6/2014 | De Cristofaro et al. | |
| 2014/0189792 | A1 | 7/2014 | Lesavich et al. | |
| 2015/0379301 | A1 | 12/2015 | Lesavich et al. | |
| 2016/0049014 | A1 | 2/2016 | Wells et al. | |
| 2016/0321654 | A1 | 11/2016 | Lesavich et al. | |
| 2017/0262863 | A1 | 9/2017 | Wells | |
| 2018/0260822 | A1 | 9/2018 | Wells | |
| 2020/0334924 | A1 | 10/2020 | Wells et al. | |
| 2022/0094556 | A1 | 3/2022 | Vestemean | |
| 2022/0094739 | A1 | 3/2022 | Vesteman et al. | |
| 2022/0384027 | A1 | 12/2022 | Kaleal et al. | |
| 2023/0091248 | A1 * | 3/2023 | Wang | G06Q 10/0639 705/328 |
| 2023/0344653 | A1 | 10/2023 | Vestemean et al. | |

* cited by examiner

38

PROTOCOL STACK
APPLICATION PROGRAMS 58
57
IGMP 50
ICMP 52
TCP 54
UDP 56
48
IP 46
44
NETWORK INTERFACE CARD DEVICE DRIVERS 40
42

Figure 7A:
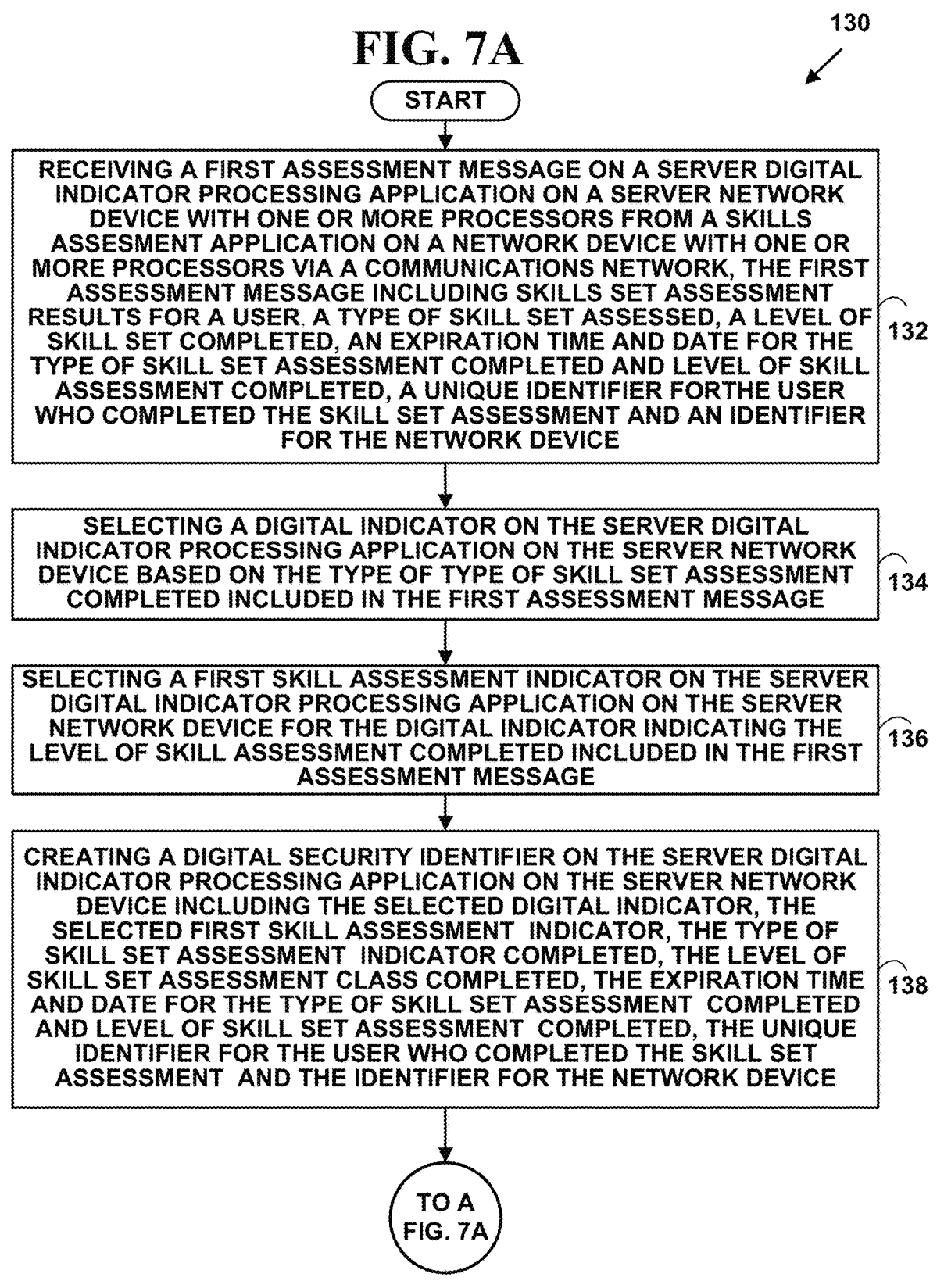

START

RECEIVING A FIRST ASSESSMENT MESSAGE ON A SERVER DIGITAL INDICATOR PROCESSING APPLICATION ON A SERVER NETWORK DEVICE WITH ONE OR MORE PROCESSORS FROM A SKILLS ASSESMENT APPLICATION ON A NETWORK DEVICE WITH ONE OR MORE PROCESSORS VIA A COMMUNICATIONS NETWORK, THE FIRST ASSESSMENT MESSAGE INCLUDING SKILLS SET ASSESSMENT RESULTS FOR A USER, A TYPE OF SKILL SET ASSESSED, A LEVEL OF SKILL SET COMPLETED, AN EXPIRATION TIME AND DATE FOR THE TYPE OF SKILL SET ASSESSMENT COMPLETED AND LEVEL OF SKILL ASSESSMENT COMPLETED, A UNIQUE IDENTIFIER FORTHE USER WHO COMPLETED THE SKILL SET ASSESSMENT AND AN IDENTIFIER FOR THE NETWORK DEVICE — 132

SELECTING A DIGITAL INDICATOR ON THE SERVER DIGITAL INDICATOR PROCESSING APPLICATION ON THE SERVER NETWORK DEVICE BASED ON THE TYPE OF TYPE OF SKILL SET ASSESSMENT COMPLETED INCLUDED IN THE FIRST ASSESSMENT MESSAGE — 134

SELECTING A FIRST SKILL ASSESSMENT INDICATOR ON THE SERVER DIGITAL INDICATOR PROCESSING APPLICATION ON THE SERVER NETWORK DEVICE FOR THE DIGITAL INDICATOR INDICATING THE LEVEL OF SKILL ASSESSMENT COMPLETED INCLUDED IN THE FIRST ASSESSMENT MESSAGE — 136

CREATING A DIGITAL SECURITY IDENTIFIER ON THE SERVER DIGITAL INDICATOR PROCESSING APPLICATION ON THE SERVER NETWORK DEVICE INCLUDING THE SELECTED DIGITAL INDICATOR, THE SELECTED FIRST SKILL ASSESSMENT INDICATOR, THE TYPE OF SKILL SET ASSESSMENT INDICATOR COMPLETED, THE LEVEL OF SKILL SET ASSESSMENT CLASS COMPLETED, THE EXPIRATION TIME AND DATE FOR THE TYPE OF SKILL SET ASSESSMENT COMPLETED AND LEVEL OF SKILL SET ASSESSMENT COMPLETED, THE UNIQUE IDENTIFIER FOR THE USER WHO COMPLETED THE SKILL SET ASSESSMENT AND THE IDENTIFIER FOR THE NETWORK DEVICE — 138

CREATING FROM THE SERVER DIGITAL INDICATOR PROCESSING APPLICATION ON THE SERVER NETWORK DEVICE A DATABASE ENTRY IN A DATABASE FOR THE CREATED DIGITAL SECURITY IDENTIFIER INCLUDING THE SELECTED DIGITAL INDICATOR, THE SELECTED FIRST SKILL SET ASSESSMENT INDICATOR, THE TYPE OF SKILL SET ASSESSMENT COMPLETED, THE LEVEL OF SKILL SET ASSESSMENT COMPLETED, THE EXPIRATION TIME AND DATE FOR THE TYPE OF SKILL SET ASSESSMENT COMPLETED AND THE LEVEL SKILL SET ASSESSMENT COMPLETED, THE UNIQUE IDENTIFIER FOR THE USER WHO COMPLETED THE SKILL SET ASSESSMENT AND THE IDENTIFIER FOR THE NETWORK DEVICE

140

SENDING A SECURE LINK FROM THE SERVER DIGITAL INDICATOR PROCESSING APPLICATION ON THE SERVER NETWORK DEVICE TO THE SKILLS ASSESSMENT APPLICATION ON THE NETWORK DEVICE VIA THE COMMUNICATIONS NETWORK INCLUDING THE CREATED DIGITAL SECURITY IDENTIFIER TO ACCESS THE SELECTED DIGITAL INDICATOR WITH THE SELECTED FIRST SKILL ASSESSMENT INDICATOR ON THE NETWORK DEVICE

142

RECEIVING A LINK SELECTION MESSAGE FROM THE SECURE LINK ON SERVER DIGITAL INDICATOR PROCESSING APPLICATION ON THE SERVER NETWORK DEVICE FROM THE NETWORK DEVICE VIA THE COMMUNICATIONS NETWORK, THE LINK SELECTION MESSAGE INCLUDING THE CREATED DIGITAL SECURITY IDENTIFIER

144

CONDUCTING A DATABASE QUERY ON THE SERVER DIGITAL INDICATOR PROCESSING APPLICATION ON THE SERVER NETWORK DEVICE WITH THE CREATED DIGITAL SECURITY IDENTIFIER RECEIVED IN THE LINK SELECTION MESSAGE TO OBTAIN THE DATABASE ENTRY INCLUDING THE CREATED DIGITAL SECURITY IDENTIFIER

146

SENDING SECURELY FROM SERVER DIGITAL INDICATOR PROCESSING APPLICATION ON THE SERVER NETWORK DEVICE THE SELECTED DIGITAL INDICATOR WITH THE SELECTED FIRST SKILL ASSESSMENT INDICATOR TO THE NETWORK DEVICE VIA THE COMMUNICATIONS NETWORK FOR DISPLAY ON THE NETWORK DEVICE, THE SELECTED DIGITAL INDICATOR WITH THE SELECTED FIRST SKILL ASSESSMENT INDICATOR INDICATING THE TYPE OF SKILL SET ASSESSMENT COMPLETED AND THE LEVEL OF SKILL SET ASSESSMENT COMPLETED BY THE USER

148

END

UPDATING FROM THE SERVER DIGITAL INDICATOR PROCESSING APPLICATION ON THE SERVER NETWORK DEVICE, THE ONE OR MORE RETRIEVED DATABASE ENTRIES INCLUDING: THE CREATED EXPIRATION DIGITAL SECURITY IDENTIFIER, THE CREATED DIGITAL SECURITY IDENTIFIER FOR THE USER OF THE NETWORK DEVICE, THE SELECTED EXPIRATION DIGITAL INDICATOR, THE LEVEL OF SKILL SET ASSESSMENT COMPLETED, THE EXPIRATION TIME AND DATE FOR THE TYPE OF SKILL SET ASSESSMENT COMPLETED AND THE LEVEL OF SKILL SET ASSESSMENT COMPLETED, THE UNIQUE IDENTIFIER FOR THE USER WHO COMPLETED THE SKILL SET ASSESSMENT AND THE IDENTIFIER FOR THE NETWORK DEVICE

172

SENDING SECURELY FROM SERVER DIGITAL INDICATOR PROCESSING APPLICATION ON THE SERVER NETWORK DEVICE THE CREATED EXPIRATION DIGITAL SECURITY IDENTIFIER WITH THE SELECTED EXPIRATION DIGITAL INDICATOR TO THE NETWORK DEVICE VIA THE COMMUNICATIONS NETWORK FOR DISPLAY ON THE NETWORK DEVICE, THE SELECTED EXPIRATION DIGITAL INDICATOR INDICATING THE LEVEL OF SKILL SET ASSESSMENT COMPLETED HAS EXPIRED, ANDTHE CREATED EXPIRATION DIGITAL SECURITY IDENTIFIER PREVENTING TAMPERING OF THE SELECTED DIGITAL INDICATOR WITH THE SELECTED EXPIRATION DIGITAL INDICATOR INDICATING THE LEVEL OF SKILL SET ASSESSMENT COMPLETED HAS EXPIRED

174

END

Figure 12:
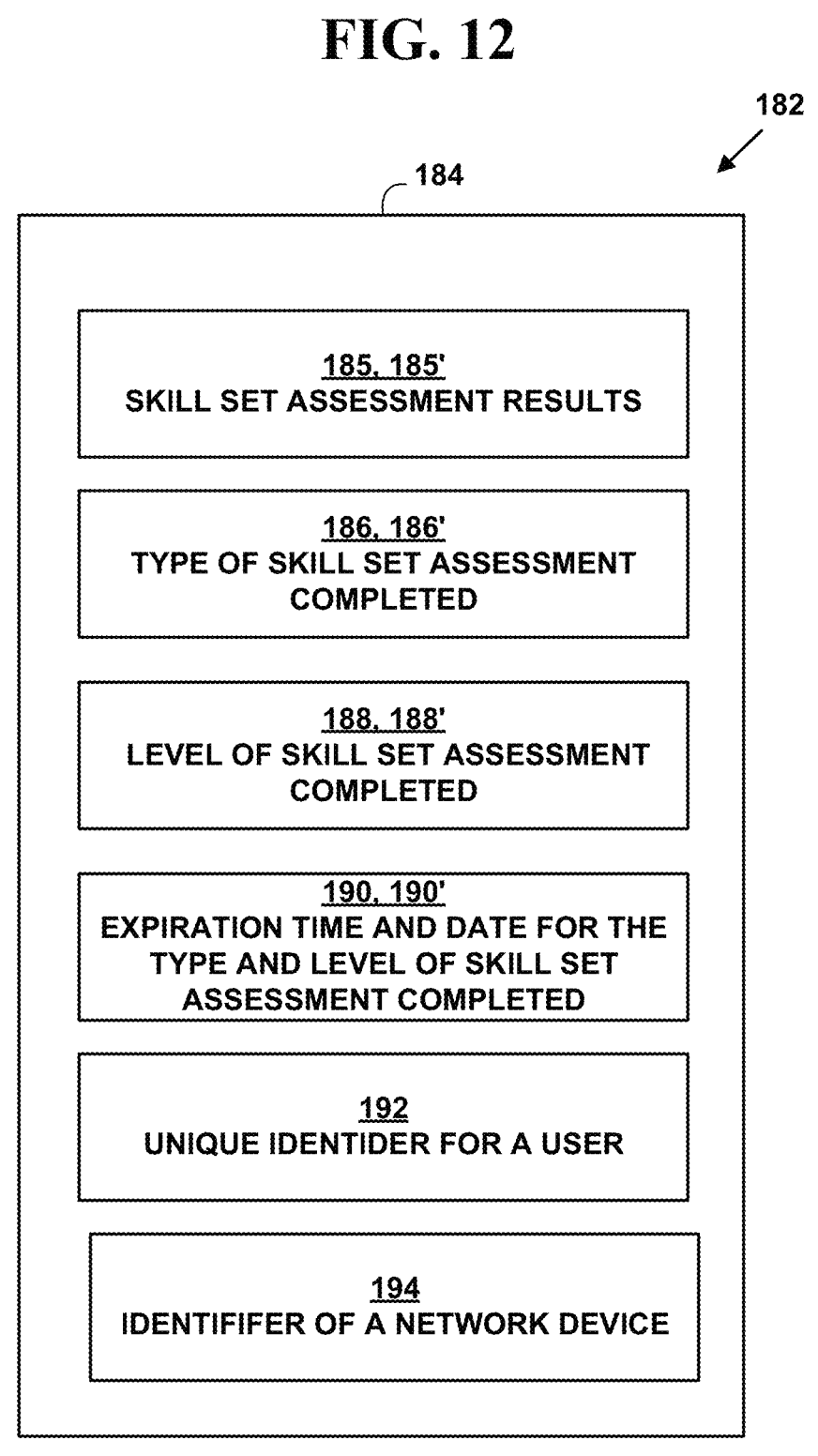

185, 185'
SKILL SET ASSESSMENT RESULTS 186, 186'
TYPE OF SKILL SET ASSESSMENT COMPLETED 188, 188'
LEVEL OF SKILL SET ASSESSMENT COMPLETED 190, 190'
EXPIRATION TIME AND DATE FOR THE TYPE AND LEVEL OF SKILL SET ASSESSMENT COMPLETED

192
UNIQUE IDENTIDER FOR A USER

194
IDENTIFIFER OF A NETWORK DEVICE

FIG. 14

METHOD AND SYSTEM FOR DYNAMIC SKILLS ASSESSMENT

CROSS REFERENCES TO RELATED APPLICATIONS

This U.S. utility patent application claims priority from U.S. Provisional patent application No. 63/592,636, filed on Oct. 24, 2023, the contents of which are incorporated by reference.

FIELD OF INVENTION

This invention relates to online skill set assessment systems. More specifically it relates to a method and system for dynamic skills assessment.

BACKGROUND OF THE INVENTION

There are many types of online skills assessment systems. These online skill systems typically provide a mechanism to dynamically display completion of a skill set assessment.

Such skill set assessment systems include professional continuing education skill set assessments (e.g., for medical professionals, lawyers, accountant, insurance professionals, police, fire, etc.). Such skill set assessment skill set assessments include non-professional skill set assessments, including academic skill set assessments and other types of skill-based skill set assessments such as advance placement skill set assessments, athletic skill set assessments, art skill set assessments, language skill set assessments, math skill set assessments, martial arts skill set assessments, music skill set assessments, etc. where proficiency and skills are developed over time.

One mechanism to record completion of skill set assessment is a certificate of completion. Another mechanism to record completion of skill set assessments is a digital badge.

There are several problems associated with using digital badges for recording completion of online skill set assessments.

One problem is that most digital badges are static in nature. Once the digital badges are issued, they are never changed once they are issued for completion of a skill set assessment.

Another problem is that a single digital badge is not used in a dynamic configuration that allows user to determine a current skill level based on development of new skills based on completion of various levels of skills in a set of skill set assessments. For example, for mastering a new language in various levels from beginner, to intermediate, to master, etc.

Another problem is that most digital badges never expire once they are issued for completion of a skill set assessment. Even the person who completed skill set assessments that is no longer active will maintain the digital badge.

Another problem is that multiple digital badges are issued for completion of a same or similar skill set assessments. For example, a new digital icon or digital badge is issued, for a legal continuation skill set assessment skill set assessments on recent court cases that were decided, for updates including new drugs or new medical procedures for a medical continuation education skill set assessments, etc.

There have been some attempts to solve some of the problems associated with using digital badges to designate completion of skill set assessments.

For example, U.S. Pat. No. 11,380,216, that issued to Balan, teaches "Provided, in an aspect, is a dynamic number board game. A method for generation of the dynamic number board game can include, receiving one or more input data associated with generation of the dynamic number board game; generating one or more timers in accordance with the received input data; determining one or more fluency metrics in accordance with the received input data; generating a primitive number board game based on the received input data; generating one or more problems for the primitive board game based on the received input data: dynamically generating one or more hints for each of the generated problems; and presenting for display, the dynamic number board game based on the primitive number board game, the one or more timers, the one or more fluency metrics, and the dynamically generated one or more hints."

U.S. Pat. No. 10,755,296, that issued to Teevan, teaches "Edits on a content item, such as a document, are divided into microtasks. The microtasks associated with a document can be automatically identified based on a workflow or can be identified by a user associated with the content item or an administrator. At a later time, the user can complete the microtasks for a content item using an application associated with their smart phone or tablet. The application may present the microtasks in a game-like environment where the user can compete with other users based on metrics such as number of microtasks completed in a day or fastest completion time. In addition, the user can earn rewards such as badges, coupons, or credits by completing microtasks. In this way, users can use time that would have been wasted playing games to complete their content items, while still experiencing some of the fun and competition associated with the games."

U.S. Pat. No. 8,671,143, that issued to Lewis teaches "A system, method, and device comprising a virtual badge are disclosed. A virtual badge can be displayed on a cell phone or in another linked portable device, and for security purposes, has images which can be scanned, and the capability to alternate colors and/or self-destruct on a pre-set schedule. Whether for after a disaster or for daily use, the system uses cell phones or mobile devices loaded with specialized software. Using plugin technologies, the system optionally can enable field collected photos and notes on customizable forms to be mapped, tracked, and time/date stamped—including in a 100% disconnected environment. A modifiable virtual badge can aid in inventory, accountability, organization, and efficiency. The system can be employed by the "Whole Community"—citizens, businesses, not-for-profits, and government agencies—for social media, business, cleanup, insurance adjusters, or personnel focused on day-to-day operations or on mitigation, preparedness, response, and recovery.

U.S. Published Patent Application No. US2022/0384027, published by Kaleal, teaches "Systems and methods are disclosed that facilitate tracking and rewarding health and fitness activities of users using blockchain technology. In an aspect, a system comprises a non-transitory memory comprising instructions, and one or more hardware processors coupled to the non-transitory memory and configured to read the instructions to cause the system to perform operations. The operations comprise receiving health and fitness information for entities, employing a blockchain network to store the health and fitness information for the entities, and sending a non-fungible token (NFT) to an entity of the entities in response to a subset of the health and fitness information associated with the entity satisfying a criterion."

U.S. Published Patent Application No. US2014/0156750, published by De Cristofaro, teaches "A system and method for verifying online dating profiles is provided. A profile is retrieved for a user on an online dating site. A social network page is identified for the user. Information about the user is accessed from the social network page, wherein the information includes one or more fields of metadata. The metadata from at least one of the fields on the social network page is compared with metadata from a corresponding field of the online dating site. A determination is made as to whether the metadata of the social network page matches the metadata of the online dating site. A certification status of the metadata is assigned to at least one of the fields on the online dating site. A certified status is assigned to the metadata when a match occurs. An uncertified status is assigned to the metadata when no match occurs."

However, none of these attempts solve all of the problems associated with measuring and recording completion of online skill set assessment for skills development.

Thus, it is desirable to solve some of the problems associated with online skill set assessment used for skills development.

SUMMARY OF THE INVENTION

In accordance with preferred embodiments of the present invention, some of the problems associated with completion of online skill set assessment are overcome. method and system for dynamic skills assessment is provided.

Digital indicators are used with dynamic skill assessment indicators to indicate plurals type of skill sets assessed, plural levels of skill sets completed, plural expiration times and dates for the plurals type of skill set assessment completed and plurals levels of skill assessment completed, plural unique identifiers for plural users who completed the plural skill set assessments and plural identifiers for plural network devices on which the plurals skill sets were assessed for the plural users. The dynamic skill assessment indicators include plural different indicators including graphical, audio, video, text and/or haptic dynamic skill assessment indicators that dynamically are changed to different colors, shapes, sizes, sounds, feelings, etc., when new skills sets are achieved and when existing skill sets expire.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIGS. 7A and 7B are a flow diagram illustrating a method for dynamic digital indicator processing for skill set assessment systems;

FIG. 8 is a flow diagram illustrating a method for dynamic digital indicator processing for skill set assessment systems;

FIGS. 9A and 9B are a flow diagram illustrating a method for dynamic digital indicator processing for v systems;

FIG. 12 is a block diagram illustrating a completion message data structure for dynamic digital indicator processing for skill set assessment systems;

FIG. 14 is a flow diagram illustrating a method for dynamic digital indicator processing for skill set assessment systems.

DETAILED DESCRIPTION OF THE INVENTION

Figure 1:
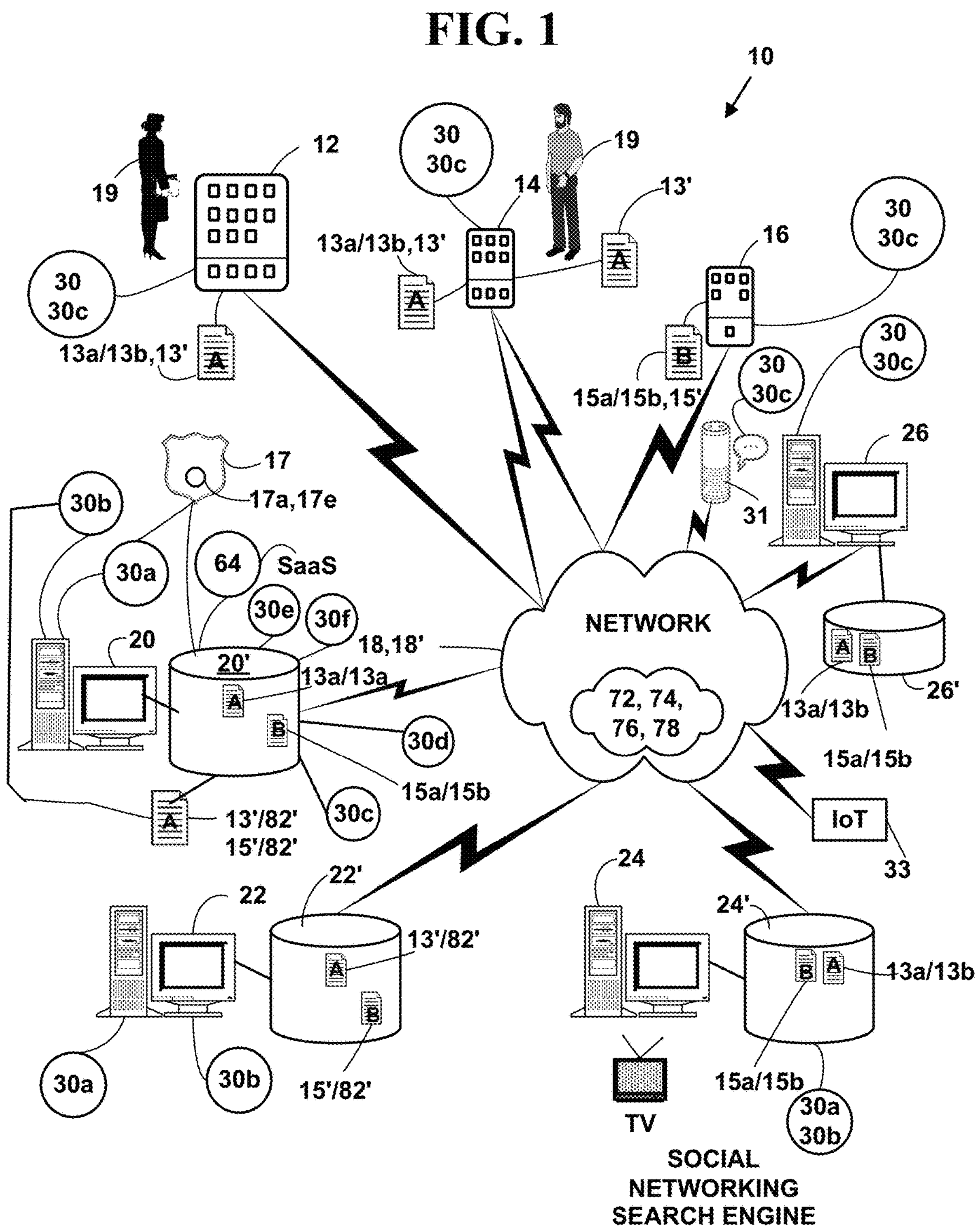
FIG. 1 is a block diagram illustrating an exemplary dynamic digital indicator for skill set assessment processing and display system.

Exemplary Online Dynamic Digital Indicator for Skill Set Assessment Processing and Display System FIG. 1 is a block diagram illustrating an exemplary dynamic digital indicator for skill set assessment processing and display system 10. The exemplary system 10 includes, but is not limited to, one or more network devices, each with one or more processors and each with a non-transitory computer readable medium, one or more target network devices 12, 14, 16, etc. each with one or more processors and each with a non-transitory computer readable medium.

The one or more target network devices 12, 14, 16 (illustrated in FIG. 1 only as a tablet and two smart phones for simplicity) include, but are not limited to, desktop and laptop computers, tablet computers, mobile phones, non-mobile phones with displays, three-dimensional (3D) printers, robots, smart phones, Internet phones, Internet appliances, personal digital/data assistants (PDA), portable, handheld and desktop video game devices, Internet of Things (IoT) devices, cable television (CATV), satellite television (SATV) and Internet television set-top boxes, digital televisions including high definition television (HDTV), three-dimensional (3DTV) televisions, wearable network devices 106-112 (FIG. 6), smart speakers 31 and/or other types of network devices.

A "smart phone" is a mobile phone 14 that offers more advanced computing ability and connectivity than a contemporary basic feature phone. Smart phones and feature phones may be thought of as handheld computers integrated with a mobile telephone, but while most feature phones are able to run applications based on platforms such as JAVA ME, a smart phone usually allows the user to install and run more advanced applications. Smart phones and/or tablet computers run complete operating system software providing a platform for application developers.

The tablet computers 12 include, but are not limited to, tablet computers such as the IPAD, by APPLE, Inc., the HP Tablet, by HEWLETT PACKARD, Inc., the PLAYBOOK, by RIM, Inc., the TABLET, by SONY, Inc., etc.

A "smart speaker" 31 is a type of wireless speaker and voice command device with an integrated virtual assistant that offers interactive actions and hands-free activation with the help of one "hot word" (or several "hot words"). Some smart speakers can also act as a smart device that utilizes Wi-Fi, Bluetooth and other wireless protocol standards to extend usage beyond audio playback, such as to control home automation devices. This can include, but is not be limited to, features such as compatibility across a number of services and platforms, peer-to-peer connection through mesh networking, virtual assistants, and others. Each can have its own designated interface and features in-house, usually launched or controlled via application or home automation software. Some smart speakers also include a screen to show the user a visual response.

The IoT network devices 33, include but are not limited to, security cameras, doorbells with real-time video cameras, baby monitors, televisions, set-top boxes, lighting, heating (e.g., smart thermostats, etc.), ventilation, air conditioning (HVAC) systems, and appliances such as washers, dryers, robotic vacuums, air purifiers, ovens, refrigerators, freezers, toys, game platform controllers, game platform attachments (e.g., guns, googles, sports equipment, etc.), and/or other IoT network devices.

The target network devices 12, 14, 16 are in communications with a cloud communications network 18 or a non-cloud computing network 18' via one or more wired and/or wireless communications interfaces. The cloud communications network 18, is also called a "cloud computing network" herein and the terms may be used interchangeably.

The plural target network devices 12, 14, 16 make requests 13, 15 for electronic messages (e.g., e-mail, SMS, MMS, RCS, DM, IM, social media, network protocol (e.g., IP, etc., telephony, etc.) via the cloud communications network 18 or non-cloud communications network 18'.

The cloud communications network 18 and non-cloud communications network 18' includes, but is not limited to, communications over a wire connected to the target network devices, wireless communications, and other types of communications using one or more communications and/or networking protocols.

Plural server network devices 20, 22, 24, 26 (only four of which are illustrated) each with one or more processors and a non-transitory computer readable medium include one or more associated databases 20', 22', 24', 26'. The plural network devices 20, 22, 24, 26 are in communications with the one or more target devices 12, 14, 16, 31, 33, 98-104 via the cloud communications network 18 and non-cloud communications network 18'.

Plural server network devices 20, 22, 24, 26 (only four of which are illustrated) are physically located on one more public networks 76 (See FIG. 4), private networks 72, community networks 74 and/or hybrid networks 78 comprising the cloud network 18.

In one embodiment, one or more server network devices (e.g., 20, 22, 24, 26, etc.) store portions 13', 15' of the electronic content 13, 15 (e.g., e-mail, SMS, MMS, RCS, DM, IM, social media, network protocol, telephony, etc.) as cloud storage objects 13'/82, 15'/82 (FIG. 5) as is described herein.

The plural server network devices 20, 22, 24 26, may be connected to, but are not limited to, World Wide Web servers, Internet servers, search engine servers, vertical search engine servers, social networking site servers, file servers, other types of electronic information servers, and other types of server network devices (e.g., edge servers, firewalls, routers, gateways, etc.).

The plural server network devices 20, 22, 24, 26 also include, but are not limited to, network servers used for cloud computing providers, etc.

The cloud communications network 18 and non-cloud communications network 18' includes, but is not limited to, a wired and/or wireless communications network comprising one or more portions of: the Internet, an intranet, a Local Area Network (LAN), a wireless LAN (WiLAN), a Wide Area Network (WAN), a Metropolitan Area Network (MAN), a Public Switched Telephone Network (PSTN), a Wireless Personal Area Network (WPAN) and other types of wired and/or wireless communications networks 18, 18'.

The cloud communications network 18 and non-cloud communications network 18' includes one or more gateways, routers, bridges and/or switches. A gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between network segments based on some pre-determined sequence (e.g., timing, sequence number, etc.).

An operating environment for the network devices of the exemplary electronic information display system 10 include a processing system with one or more high speed Central Processing Unit(s) (CPU), processors, one or more memories and/or other types of non-transitory computer readable mediums. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical information by the CPU or processor. An electrical system represents data bits which cause a resulting transformation or reduction of the electrical information or biological information, and the maintenance of data bits at memory locations in a memory system to thereby reconfigure or otherwise alter the CPU's or processor's operation, as well as other processing of information. The memory locations where data bits are maintained are physical locations that have particular electrical, magnetic, optical, or organic properties corresponding to the data bits.

The data bits may also be maintained on a non-transitory computer readable medium including magnetic disks, optical disks, organic memory, and any other volatile (e.g., Random Access Memory (RAM)) or non-volatile (e.g., Read-Only Memory (ROM), flash memory, etc.) mass storage system readable by the CPU. The non-transitory computer readable medium includes cooperating or interconnected computer readable medium, which exist exclusively on the processing system or can be distributed among multiple interconnected processing systems that may be local or remote to the processing system.

Figure 2:
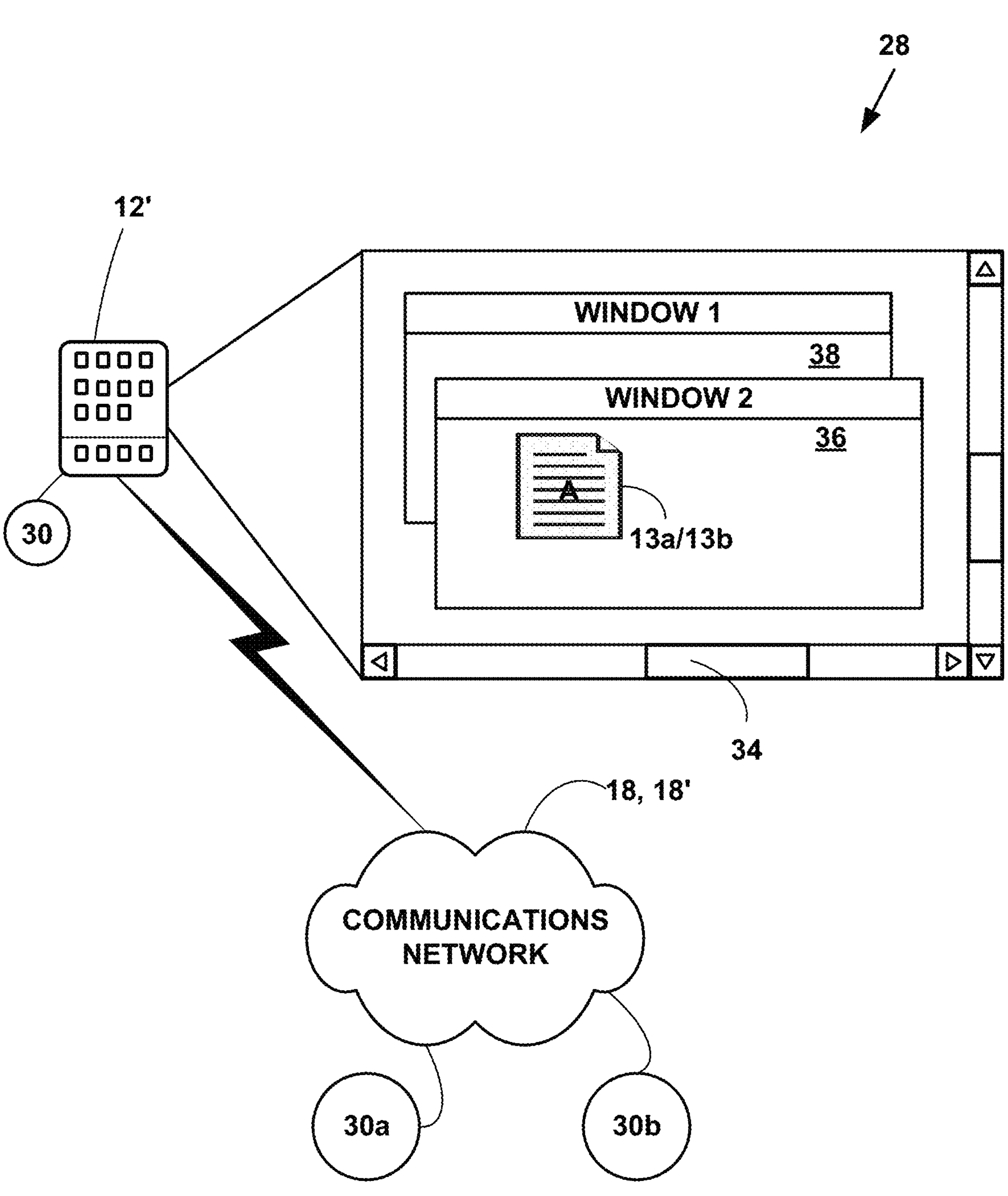
FIG. 2 is a block diagram illustrating an exemplary dynamic digital indicator for skill set assessment display system.

Exemplary Dynamic Digital Indicator for Skill Set Assessment Processing and Display System FIG. 2 is a block diagram illustrating an exemplary dynamic digital indicator processing and display system 28. The exemplary electronic message information display system 12' includes, but is not limited to a target network device (e.g., 12, etc.) with an application 30 and a display component 32. The application 30 presents a graphical user interface (GUI) 34 on the display 32 component. The GUI 32 presents a multi-window 36, 38, etc. (only two of which are illustrated) interface to a user.

In one embodiment of the invention, the application 30 is a software application. However, the present invention is not limited to this embodiment and the application 30 can be hardware, firmware, hardware and/or any combination thereof. In one embodiment, the application 30 includes a mobile application for a smart phone, electronic tablet and/or other network device. In one embodiment, the application 30 includes web-browser based application. In one embodiment, the application 30 includes a web-chat client application. In another embodiment, the application 30*a*, 30*b*, 30*c*, 30*d*, 30*c*, 30*f* includes a cloud application used on a cloud communications network 18. However, the present invention is not limited these embodiments and other embodiments can be used to practice the invention In another embodiment, a portion of the application 30 is executing on the target network devices 12, 14, 16, 31, 33, 98-104 and another portion of the application 30*a*, 30*b*, 30*c*, 30*d*, 30*e*, 30*f* is executing on the server network devices 20, 22, 24, 26. The applications also include one or more library applications. However, the present invention is not limited these embodiments and other embodiments can be used to practice the invention.

Exemplary Networking Protocol Stack

Figure 3:
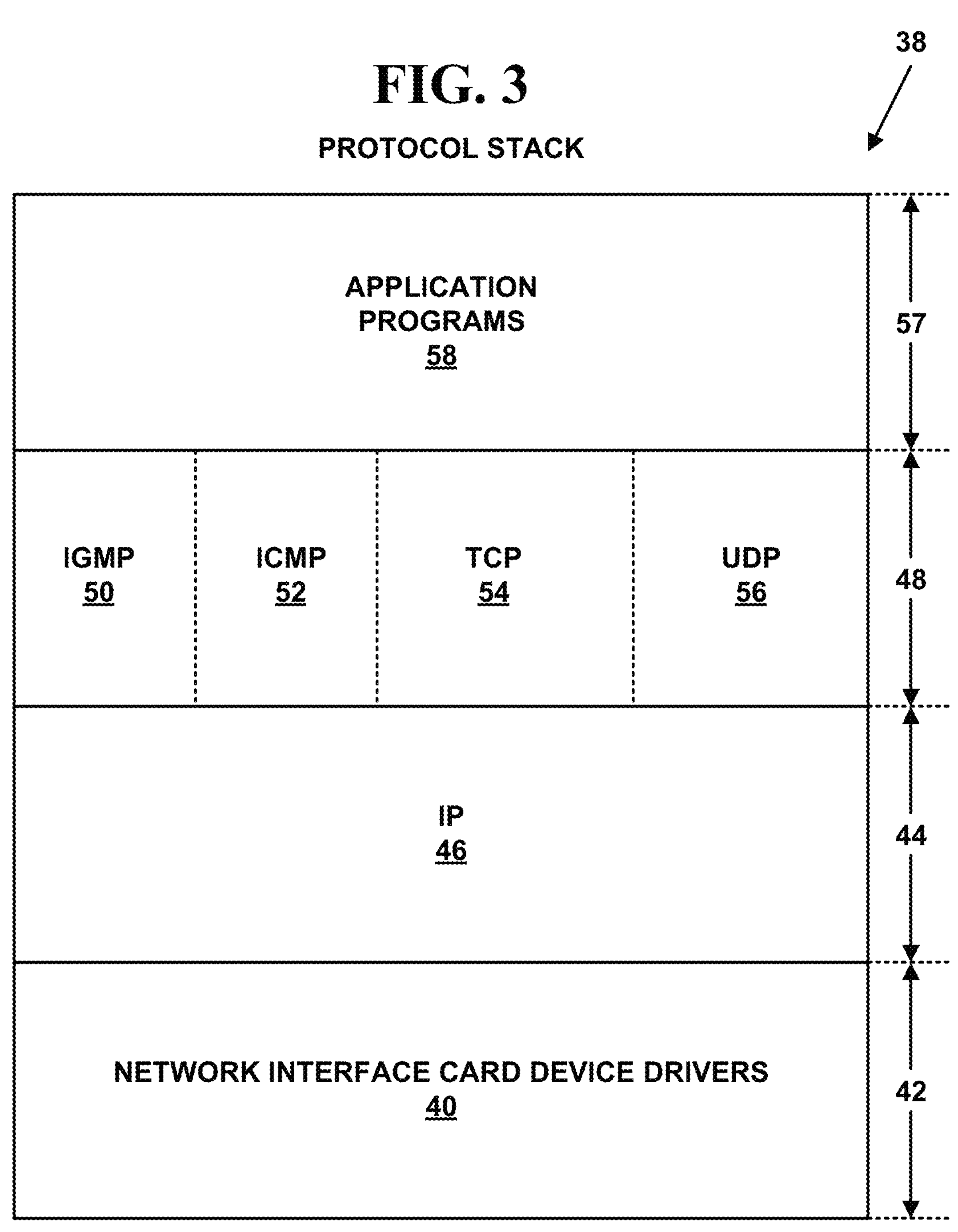
FIG. 3 is a block diagram illustrating an exemplary networking protocol stack.

FIG. 3 a block diagram illustrating a layered protocol stack 38 for network devices in the dynamic digital indicator for skill set assessment processing and display system 10. The layered protocol stack 38 is described with respect to Internet Protocol (IP) suites comprising in general from lowest-to-highest, a link 42, network 44, transport 48 and application 56 layers. However, more or fewer layers could also be used, and different layer designations could also be used for the layers in the protocol stack 38 (e.g., layering based on the Open Systems Interconnection (OSI) model including from lowest-to-highest, a physical, data-link, network, transport, session, presentation and application layer.).

The network devices 12, 14, 16, 20, 22, 24, 26, 31, 33, 98-104 are connected to the communication network 18 with Network Interface Card (NIC) cards including device drivers 40 in a link layer 42 for the actual hardware connecting the network devices 12, 14, 16, 20, 22, 24, 26, 31, 33, 98-104 to the cloud communications network 18. For example, the NIC device drivers 40 may include a serial port device driver, a digital subscriber line (DSL) device driver, an Ethernet device driver, a wireless device driver, a wired device driver, etc. The device driver interface with the actual hardware being used to connect the network devices to the cloud communications network 18. The NIC cards have a medium access control (MAC) address that is unique to each NIC and unique across the whole cloud network 18. The Medium Access Control (MAC) protocol is used to provide a data link layer of an Ethernet LAN system and for other network systems.

Above the link layer 42 is a network layer 44 (also called the Internet Layer for Internet Protocol (IP) suites). The network layer 44 includes, but is not limited to, an IP layer 46.

IP 46 is an addressing protocol designed to route traffic within a network or between networks. However, more, fewer or other protocols can also be used in the network layer 44, and the present invention is not limited to IP 46. For more information on IP 46 see IETF RFC-791, incorporated herein by reference.

Above network layer 44 is a transport layer 48. The transport layer 48 includes, but is not limited to, an optional Internet Group Management Protocol (IGMP) layer 50, a Internet Control Message Protocol (ICMP) layer 52, a Transmission Control Protocol (TCP) layer 52 and a User Datagram Protocol (UDP) layer 54. However, more, fewer or other protocols could also be used in the transport layer 48.

Optional IGMP layer 50, hereinafter IGMP 50, is responsible for multicasting. For more information on IGMP 50 see RFC-1112, incorporated herein by reference. ICMP layer 52, hereinafter ICMP 52 is used for IP 46 control. The main functions of ICMP 52 include error reporting, reachability testing (e.g., pinging, etc.), route-change notification, performance, subnet addressing and other maintenance. For more information on ICMP 52 see RFC-792, incorporated herein by reference. Both IGMP 50 and ICMP 52 are not required in the protocol stack 38. ICMP 52 can be used alone without optional IGMP layer 50.

TCP layer 54, hereinafter TCP 54, provides a connection-oriented, end-to-end reliable protocol designed to fit into a layered hierarchy of protocols which support multi-network applications. TCP 54 provides for reliable inter-process communication between pairs of processes in network devices attached to distinct but interconnected networks. For more information on TCP 54 see RFC-793, incorporated herein by reference.

UDP layer 56, hereinafter UDP 56, provides a connectionless mode of communications with datagrams in an interconnected set of computer networks. UDP 56 provides a transaction-oriented datagram protocol, where delivery and duplicate packet protection are not guaranteed. For more information on UDP 56 see RFC-768, incorporated herein by reference. Both TCP 54 and UDP 56 are not required in protocol stack 38. Either TCP 54 or UDP 56 can be used without the other.

Above transport layer 48 is an application layer 57 where application programs 58 (e.g., 30, 30*a*, 30*b*, 30*c*, 30*d*, etc.) to carry out desired functionality for a network device reside. For example, the application programs 58 for the client network devices 12, 14, 16, 27, 29, 31, 33, 98-104 may include web-browsers or other application programs, application program 30, while application programs for the server network devices 20, 22, 24, 26 may include other application programs (e.g., 30*a*, 30*b*, 30*c*, 30*d*, etc.).

In one embodiment, application program 30 includes a dynamic digital indicator processing for skill set assessment systems application 30*a*, a dynamic digital indicator processing for skill set assessment systems network application 30*b*, an Artificial Intelligence (AI) application 30*c* and/or other application 30*d*. However, the present invention is not limited to such an embodiment and more, fewer and/or other applications can be used to practice the invention.

However, the protocol stack 38 is not limited to the protocol layers illustrated and more, fewer or other layers and protocols can also be used in protocol stack 38. In addition, other protocols from the Internet Protocol suites (e.g., Simple Mail Transfer Protocol, (SMTP), Hyper Text Transfer Protocol (HTTP), File Transfer Protocol (FTP), Dynamic Host Configuration Protocol (DHCP), DNS, etc.), Short Message Peer-to-Peer (SMPP), and/or other protocols from other protocol suites may also be used in protocol stack 38.

In addition, markup languages such as HyperText Markup Language (HTML), Extensible Markup Language (XML) and others are used.

HyperText Markup Language (HTML) is a markup language for creating web pages and other information that can be displayed in a web browser.

HTML is written in the form of HTML elements consisting of tags enclosed in angle brackets within the web page content. HTML tags most commonly come in pairs although some tags represent empty elements and so are unpaired. The first tag in a pair is the start tag, and the second tag is the end tag (they are also called opening tags and closing tags). In between these tags web designers can add text, further tags, comments and other types of text-based content.

The purpose of a web browser is to read HTML documents and compose them into visible or audible web pages. The browser does not display the HTML tags, but uses the tags to interpret the content of the page.

HTML elements form the building blocks of all websites. HTML allows images and objects to be embedded and can be used to create interactive forms. It provides a means to create structured documents by denoting structural semantics for text such as headings, paragraphs, lists, links, quotes and other items. It can embed scripts written in languages such as JavaScript which affect the behavior of HTML web pages.

Extensible Markup Language (XML) is another markup language that defines a set of rules for encoding documents in a format that is both human-readable and machine-readable. It is defined in the XML 1.0 Specification produced by the W3C, the contents of which are incorporated by reference and several other related specifications, all free open standards.

XML a textual data format with strong support via Unicode for the languages of the world. Although the design of XML focuses on documents, it is widely used for the representation of arbitrary data structures, for example in web services. The oldest schema language for XML is the Document Type Definition (DTD). DTDs within XML documents define entities, which are arbitrary fragments of text and/or markup tags that the XML processor inserts in the DTD itself and in the XML document wherever they are referenced, like character escapes.

The Short Message Peer-to-Peer (SMPP) protocol in the telecommunications industry is an open, industry standard protocol designed to provide a flexible data communication interface for the transfer of short message data between External Short Messaging Entities, Routing Entities (ESME) and Short Message Service Center (SMSC).

Preferred embodiments of the present invention include network devices and wired and wireless interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Bluetooth Forum, or the ADSL Forum.

Wireless Interfaces

In one embodiment of the present invention, the wireless interfaces on network devices 12, 14, 16, 20, 22, 24, 26, 31, 33, 98-104 include but are not limited to, IEEE 802.11a, 802.11b, 802.11g, 802.11n, 802.15.4 (ZigBee), “Wireless Fidelity” (Wi-Fi), “Worldwide Interoperability for Microwave Access” (WiMAX), ETSI High Performance Radio Metropolitan Area Network (HIPERMAN) or “RF Home” wireless interfaces. In another embodiment of the present invention, the wireless sensor device may include an integral or separate Bluetooth and/or infra data association (IrDA) module for wireless Bluetooth or wireless infrared communications. However, the present invention is not limited to such an embodiment and other 802.11xx and other types of wireless interfaces can also be used.

802.11b is a short-range wireless network standard. The IEEE 802.11b standard defines wireless interfaces that provide up to 11 Mbps wireless data transmission to and from wireless devices over short ranges. 802.11a is an extension of the 802.11b and can deliver speeds up to 54M bps. 802.11g deliver speeds on par with 802.11a. However, other 802.11XX interfaces can also be used and the present invention is not limited to the 802.11 protocols defined. The IEEE 802.11a, 802.11b and 802.11g standards are incorporated herein by reference.

Wi-Fi is a type of 802.11xx interface, whether 802.11b, 802.11a, dual-band, etc. Wi-Fi devices include RF interfaces such as 2.4 GHz for 802.11b or 802.11g and 5 GHz for 802.11a.

802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, a full handshake protocol for transfer reliability, power management to ensure low power consumption for multi-month to multi-year battery usage and up to 16 channels in the 2.4 GHz Industrial, Scientific and Medical (ISM) band (Worldwide), 10 channels in the 915 MHz (US) and one channel in the 868 MHz band (Europe). The IEEE 802.15.4-2003 standard is incorporated herein by reference.

WiMAX is an industry trade organization formed by leading communications component and equipment companies to promote and certify compatibility and interoperability of broadband wireless access equipment that conforms to the IEEE 802.16XX and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. WiMAX can be used to provide a WLP.

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. ETSI HIPERMAN can be used to provide a WLP.

In one embodiment, the plural server network devices 20, 22, 24, 26 include a connection to plural network interface cards (NICs) in a backplane connected to a communications bus. The NIC cards provide gigabit/second ($1\times10^9$ bits/second) communications speed of electronic information. This allows "scaling out" for fast electronic content retrieval. The NICs are connected to the plural server network devices 20, 22, 24, 26 and the cloud communications network 18. However, the present invention is not limited to the NICs described and other types of NICs in other configurations and connections with and/or without buses can also be used to practice the invention.

In one embodiment, of the invention, the wireless interfaces also include wireless personal area network (WPAN) interfaces. As is known in the art, a WPAN is a personal area network for interconnecting devices centered around an individual person's devices in which the connections are wireless. A WPAN interconnects all the ordinary computing and communicating devices that a person has on their desk (e.g. computer, etc.) or carry with them (e.g., PDA, mobile phone, smart phone, table computer two-way pager, etc.).

A key concept in WPAN technology is known as "plugging in." In the ideal scenario, when any two WPAN-equipped devices come into close proximity (within several meters and/or feet of each other) or within a few miles and/or kilometers of a central server (not illustrated), they can communicate via wireless communications as if connected by a cable. WPAN devices can also lock out other devices selectively, preventing needless interference or unauthorized access to secure information. Zigbee is one wireless protocol used on WPAN networks such as cloud communications network 18 or non-cloud communications network 18'.

The one or more target network devices 12, 14, 16, 20, 22, 24, 26, 31, 33, 98-104 and one or more server network devices 20, 22, 24, 26 communicate with each other and other network devices with near field communications (NFC) and/or machine-to-machine (M2M) communications.

"Near field communication (NFC)" is a set of standards for smartphones and similar network devices to establish radio communication with each other by touching them together or bringing them into close proximity, usually no more than a few centimeters. Present applications include contactless transactions, data exchange, and simplified setup of more complex communications such as Wi-Fi. Communication is also possible between an NFC device and an unpowered NFC chip, called a "tag" including radio frequency identifier (RFID) tags 99 and/or sensor.

NFC standards cover communications protocols and data exchange formats, and are based on existing radio-frequency identification (RFID) standards including ISO/IEC 14443 and FeliCa. These standards include ISO/IEC 1809 and those defined by the NFC Forum, all of which are incorporated by reference.

An "RFID tag" is an object that can be applied to or incorporated into a product, animal, or person for the purpose of identification and/or tracking using RF signals.

An "RFID sensor" is a device that measures a physical quantity and converts it into an RF signal which can be read by an observer or by an instrument (e.g., target network devices 12, 14, 16, 20, 22, 24, 26, 31, 98-104, server network devices 20, 22, 24, 26, etc.).

"Machine to machine (M2M)" refers to technologies that allow both wireless and wired systems to communicate with other devices of the same ability. M2M uses a device to capture an event (such as option purchase, etc.), which is relayed through a network (wireless, wired cloud, etc.) to an application (software program), that translates the captured event into meaningful information. Such communication was originally accomplished by having a remote network of machines relay information back to a central hub for analysis, which would then be rerouted into a system like a personal computer.

However, modern M2M communication has expanded beyond a one-to-one connection and changed into a system of networks that transmits data many-to-one and many-to-many to plural different types of devices and appliances. The expansion of IP networks across the world has made it far easier for M2M communication to take place and has lessened the amount of power and time necessary for information to be communicated between machines.

However, the present invention is not limited to such wireless interfaces and wireless networks and more, fewer and/or other wireless interfaces can be used to practice the invention.

Wired Interfaces

In one embodiment of the present invention, the wired interfaces include wired interfaces and corresponding networking protocols for wired connections to the Public Switched Telephone Network (PSTN) and/or a cable television network (CATV) and/or satellite television networks (SATV) and/or three-dimensional television (3DTV), including HDTV that connect the network devices 12, 14, 16, 20, 22, 24, 26, 31, 33, 98-104 via one or more twisted pairs of copper wires, digital subscriber lines (e.g. DSL, ADSL, VDSL, etc.) coaxial cable, fiber optic cable, other connection media or other connection interfaces. The PSTN is any public switched telephone network provided by AT&T, GTE, Sprint, MCI, SBC, Verizon and others. The CATV is any cable television network provided by the Comcast, Time Warner, etc. However, the present invention is not limited to such wired interfaces and more, fewer and/or other wired interfaces can be used to practice the invention.

Television Services

In one embodiment, the cloud applications 30, 30*a*, 30*b*, 30*c*, 30*d*, 30*e*, 30*f* provide cloud SaaS 64 services and/or non-cloud application services from television services over the cloud communications network 18 or application services over the non-cloud communications network 18'. The television services include digital television services, including, but not limited to, cable television, satellite television, high-definition television, three-dimensional, televisions and other types of network devices.

However, the present invention is not limited to such television services and more, fewer and/or other television services can be used to practice the invention.

Internet Television Services

In one embodiment, the cloud applications 30, 30*a*, 30*b*, 30*c*, 30*d*, 30*e*, 30*f* provide cloud SaaS 64 services and/or non-cloud application services from Internet television services over the cloud communications network 18 or non-cloud communications network 18'. The television services include Internet television, Web-TV, and/or Internet Protocol Television (IPtv) and/or other broadcast television services.

"Internet television" allows users to choose a program or the television show they want to watch from an archive of programs or from a channel directory. The two forms of viewing Internet television are streaming content directly to a media player or simply downloading a program to a viewer's set-top box, game console, computer, or other network device.

"Web-TV" delivers digital content via broadband and mobile networks. The digital content is streamed to a viewer's set-top box, game console, computer, or other network device.

"Internet Protocol television (IPtv)" is a system through which Internet television services are delivered using the architecture and networking methods of the Internet Protocol Suite over a packet-switched network infrastructure, e.g., the Internet and broadband Internet access networks, instead of being delivered through traditional radio frequency broadcast, satellite signal, and cable television formats.

However, the present invention is not limited to such Internet Television services and more, fewer and/or other Internet Television services can be used to practice the invention.

General Search Engine Services

In one embodiment, the cloud applications 30, 30*a*, 30*b*, 30*c*, 30*d*, 30*e*, 30*f* provide cloud SaaS 64 services and/or non-cloud application services from general search engine services. A search engine is designed to search for information on a cloud communications network 18 or non-cloud communications network 18' such as the Internet including World Wide Web servers, HTTP, FTP servers etc. The search results are generally presented in a list of electronic results. The information may consist of web pages, images, electronic information, multimedia information, and other types of files. Some search engines also mine data available in databases or open directories. Unlike web directories, which are maintained by human editors, search engines typically operate algorithmically and/or are a mixture of algorithmic and human input.

In one embodiment, the cloud applications 30, 30*a*, 30*b*, 30*c*, 30*d*, 30*e*, 30*f* provide cloud SaaS 64 services and/or non-cloud application services from general search engine services. In another embodiment, the cloud applications 30, 30*a*, 30*b*, 30*c*, 30*d*, 30*e*, 30*f* provide general search engine services by interacting with one or more other public search engines (e.g., GOOGLE, BING, YAHOO, etc.) and/or private search engine services.

In another embodiment, the cloud applications 30, 30*a*, 30*b*, 30*c*, 30*d*, 30*e*, 30*f* provide cloud SaaS 64 services and/or non-cloud application services from specialized search engine services, such as vertical search engine services by interacting with one or more other public vertical search engines and/or private search engine services.

However, the present invention is not limited to such general and/or vertical search engine services and more, fewer and/or other general search engine services can be used to practice the invention.

Social Networking Services

In one embodiment, the cloud applications 30, 30*a*, 30*b*, 30*c*, 30*d*, 30*e*, 30*f* provide cloud SaaS 64 services and/or non-cloud application services from one more social networking services including to/from one or more social networking web-sites (e.g., FACEBOOK, YOUTUBE, TWITTER, INSTAGRAM, etc.). The social networking web-sites also include, but are not limited to, social couponing sites, dating web-sites, blogs, RSS feeds, and other types of information web-sites in which messages can be left or posted for a variety of social activities.

However, the present invention is not limited to the social networking services described and other public and private social networking services can also be used to practice the invention.

Security and Encryption

Network devices 12, 14, 16, 20, 22, 24, 26, 31, 33, 98-104 with wired and/or wireless interfaces of the present invention include one or more of the security and encryptions techniques discussed herein for secure communications on the cloud communications network 18 or non-cloud communications network 18'.

Application programs 58 (FIG. 2) include security and/or encryption application programs integral to and/or separate from the applications 30, 30*a*, 30*b*, 30*c*, 30*d*. Security and/or encryption programs may also exist in hardware components on the network devices (12, 14, 16, 20, 22, 24, 26, 31, 98-104) described herein and/or exist in a combination of hardware, software and/or firmware.

Wireless Encryption Protocol (WEP) (also called "Wired Equivalent Privacy) is a security protocol for WiLANs defined in the IEEE 802.11b standard. WEP is cryptographic privacy algorithm, based on the Rivest Cipher 4 (R194) encryption engine, used to provide confidentiality for 802.11b wireless data.

R194 is cipher designed by RSA Data Security, Inc. of Bedford, Massachusetts, which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11X WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i standard is based on 802.1x port-based authentication for user and device authentication. The 802.11i standard includes two main developments: Wi-Fi Protected Access (WPA) and Robust Security Network (RSN).

WPA uses the same R194 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES).

DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher algorithm. 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired and incorporated herein by reference.

"Hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length<264 bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

Providing a way to check the integrity of information transmitted over or stored in an unreliable medium such as a wireless network is a prime necessity in the world of open computing and communications. Mechanisms that provide such integrity check based on a secret key are called "message authentication codes" (MAC). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

An Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

The HyperText Transport Protocol (HTTP) Secure (HTTPs), is a standard for encrypted communications on the World Wide Web. HTTPs is actually just HTTP over a Secure Sockets Layer (SSL). For more information on HTTP, see IETF RFC-2616 incorporated herein by reference.

The SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digital signatures. The security methods are negotiated between the source and destination at the start of establishing a protocol session. The SSL 2.0 protocol specification, by Kipp E. B. Hickman, 1995 is incorporated herein by reference. More information on SSL is available at the domain name.

Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

In one embodiment, the security functionality includes Cisco Compatible EXtensions (CCX). CCX includes security specifications for makers of 802.11xx wireless LAN chips for ensuring compliance with Cisco's proprietary wireless security LAN protocols. As is known in the art, Cisco Systems, Inc. of San Jose, California is supplier of networking hardware and software, including router and security products.

However, the present invention is not limited to such security and encryption methods described herein and more, fewer and/or other types of security and encryption methods can be used to practice the invention. The security and encryption methods described herein can also be used in various combinations and/or in different layers of the protocol stack 38 with each other.

Cloud Computing Networks

Figure 4:
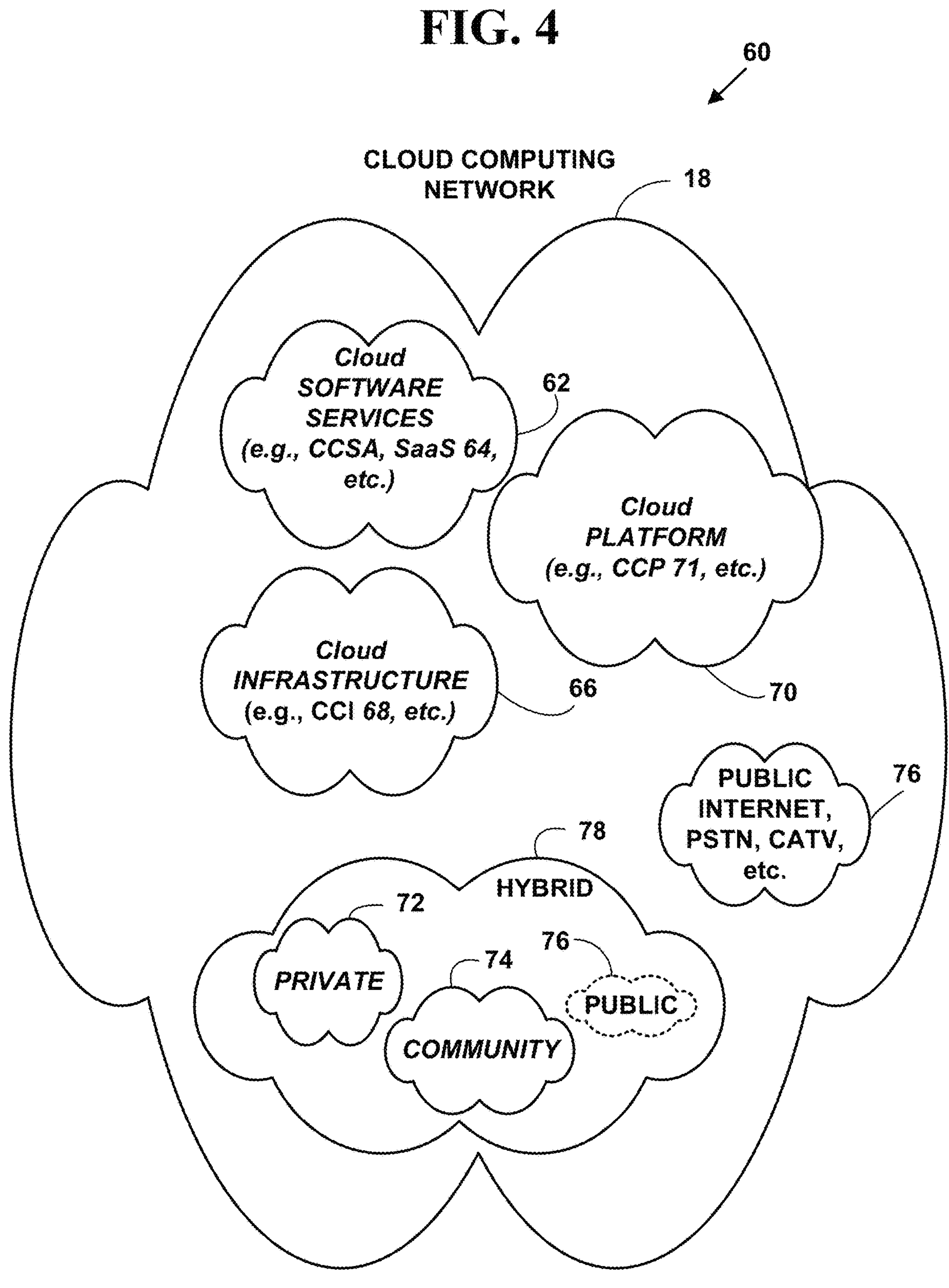
FIG. 4 is a block diagram illustrating an exemplary cloud communications network.

FIG. 4 is a block diagram 60 illustrating an exemplary cloud computing network 18. The cloud computing network 18 is also referred to as a "cloud communications network" 18. However, the present invention is not limited to this cloud computing model and other cloud computing models can also be used to practice the invention. The exemplary cloud communications network includes both wired and/or wireless components of public and private networks.

In one embodiment, the cloud computing network 18 includes a cloud communications network 18 comprising plural different cloud component networks 72, 74, 76, 78. "Cloud computing" is a model for enabling, on-demand network access to a shared pool of configurable computing resources (e.g., public and private networks, servers, storage, applications, and services) that are shared, rapidly provisioned and released with minimal management effort or service provider interaction.

This exemplary cloud computing model for electronic information retrieval promotes availability for shared resources and comprises: (1) cloud computing essential characteristics; (2) cloud computing service models; and (3) cloud computing deployment models. However, the present invention is not limited to this cloud computing model and other cloud computing models can also be used to practice the invention.

Exemplary cloud computing essential characteristics appear in Table 1. However, the present invention is not limited to these essential characteristics and more, fewer or other characteristics can also be used to practice the invention.

TABLE 1

1. On-demand Digital indicator interoperability services. Automatic online dynamic digital indicator for skill set assessment processing services can unilaterally provision computing capabilities, such as server time and network storage, as needed automatically without requiring human interaction with each network server on the cloud communications network 18.
2. Broadband network access. Automatic online dynamic digital indicator for skill set assessment processing services capabilities are available over plural broadband communications networks and accessed through standard mechanisms that promote use by heterogeneous thin or thick client platforms (e.g., mobile phones, smart phones 14, tablet computers 12, laptops, PDAs, etc.). The broadband network access includes high speed network access such as 3G, 4G and 5G wireless and/or wired and broadband and/or ultra-broad band (e.g., WiMAX, etc.) network access.
3. Resource pooling. Automatic online dynamic digital indicator for skill set assessment processing services resources are pooled to serve multiple requesters using a multi-tenant model, with different physical and virtual resources dynamically assigned and reassigned according to demand. There is location independence in that a requester of services has no control and/or knowledge over the exact location of the provided by the dynamic digital indicator for skill set assessment interoperability service resources but may be able to specify location at a higher level of abstraction (e.g., country, state, or data center). Examples of pooled resources include storage, processing, memory, network bandwidth, virtual server network device and virtual target network devices.
4. Rapid elasticity. Capabilities can be rapidly and elastically provisioned, in some cases automatically, to quickly scale out and rapidly released to quickly scale for education interoperability service collaboration. For automatic dynamic digital indicator for skill set assessment interoperability services, multi-media collaboration converters, the automatic online dynamic digital indicator for skill set assessment processing services collaboration and analytic conversion capabilities available for provisioning appear to be unlimited and can be used in any quantity at any time.
5. Measured Services. Cloud computing systems automatically control and optimize resource use by leveraging a metering capability at some level of abstraction appropriate to the type of automatic online dynamic digital indicator for skill set assessment processing services (e.g., storage, processing, bandwidth, custom electronic content retrieval applications, etc.). Electronic Automatic online dynamic digital indicator for skill set assessment processing services collaboration conversion usage is monitored, controlled, and reported providing transparency for both the automatic online dynamic digital indicator for skill set assessment processing services provider and the automatic dynamic digital indicator for skill set assessment interoperability service requester of the utilized electronic content storage retrieval service.

Exemplary cloud computing service models illustrated in FIG. 4 appear in Table 2. However, the present invention is not limited to these service models and more, fewer or other service models can also be used to practice the invention.

TABLE 2

1. Cloud Computing Software Applications 62 for online dynamic digital indicator for skill set assessment processing services (CCSA, SaaS 64). The capability to use the provider's applications 30, 30a, 30b, 30c, 30d, 30e, 30f running on a cloud infrastructure 66. The cloud computing applications 62, are accessible from the server network device 20 from various client devices 12, 14, 16 through a thin client interface such as a web browser, etc. The user does not manage or control the underlying cloud infrastructure 66 including network, servers, operating systems, storage, or even individual application 30, 30a, 30b, 30c, 30d, 30e, 30f capabilities, with the possible exception of limited user-specific application configuration settings.
2. Cloud Computing Infrastructure 66 for online dynamic digital indicator for skill set assessment processing services (CCI 68). The capability provided to the user is to provision processing, storage and retrieval, networks 18, 72, 74, 76, 78 and other fundamental computing resources where the consumer is able to deploy and run arbitrary software, which can include operating systems and applications 30, 30a, 30b, 30c, 30d 30e, 30f. The user does not manage or control the underlying cloud infrastructure 66 but has control over operating systems, storage, deployed applications, and possibly limited control of select networking components (e.g., host firewalls, etc.).
3. Cloud Computing Platform 70 for online dynamic digital indicator for skill set assessment processing services (CCP 71). The capability provided to the user to deploy onto the cloud infrastructure 66 created or acquired applications created using programming languages and tools supported servers 20, 22, 24, 26, etc. The user not manage or control the underlying cloud infrastructure 66 including network, servers, operating systems, or storage, but has control over the deployed applications 30a, 30b, 30c, 30d, 30e, 30f and possibly application hosting environment configurations.

Exemplary cloud computing deployment models appear in Table 3. However, the present invention is not limited to these deployment models and more, fewer or other deployment models can also be used to practice the invention.

TABLE 3

1. Private cloud network 72. The cloud network infrastructure is operated solely for dynamic digital indicator for skill set assessment interoperability services. It may be managed by the electronic content retrieval or a third party and may exist on premise or off premise.
2. Community cloud network 74. The cloud network infrastructure is shared by several different organizations and supports a specific electronic content storage and retrieval community that has shared concerns (e.g., mission, security requirements, policy, compliance considerations, etc.). It may be managed by the different organizations or a third party and may exist on premise or off premise.
3. Public cloud network 76. The cloud network infrastructure such as the Internet, PSTN, SATV, CATV, Internet TV, etc. is made available to the general public or a large industry group and is owned by one or more organizations selling cloud services.
4. Hybrid cloud network 78. The cloud network infrastructure 66 is a TABLE 3-continued

| |
|---|
| composition of two and/or more cloud networks 18 (e.g., private 72, community 74, and/or public 76, etc.) and/or other types of public and/or private networks (e.g., intranets, etc.) that remain unique entities but are bound together by standardized or proprietary technology that enables data and application portability (e.g., cloud bursting for load-balancing between clouds, etc.) |

Cloud software 64 for electronic content retrieval takes full advantage of the cloud paradigm by being service oriented with a focus on statelessness, low coupling, modularity, and semantic interoperability for electronic content retrieval. However, cloud software services 64 can include various states.

Cloud storage of desired electronic content on a cloud computing network includes agility, scalability, elasticity and multi-tenancy. Although a storage foundation may be comprised of block storage or file storage such as that exists on conventional networks, cloud storage is typically exposed to requesters of desired electronic content as cloud objects.

In one exemplary embodiment, the cloud application 30, 30*a*, 30*b*, 30*c*, 30*d*, offers cloud services for online dynamic digital indicator for skill set assessment processing services. The application 30, 30*a*, 30*b*, 30*c*, 30*d*, 30*e*, 30*f* offers the cloud computing Infrastructure 66, 68 as a Service 62 (IaaS), including a cloud software infrastructure service 62, the cloud Platform 70, 71 as a Service 62 (PaaS) including a cloud software platform service 62 and/or offers Specific cloud software services as a Service 64 (SaaS) including a specific cloud software service 64 for online dynamic digital indicator for skill set assessment processing services. The IaaS, PaaS and SaaS include one or more of cloud services 62 comprising networking, storage, server network device, virtualization, operating system, middleware, run-time, data and/or application services, or plural combinations thereof, on the cloud communications network 18.

Figure 5:
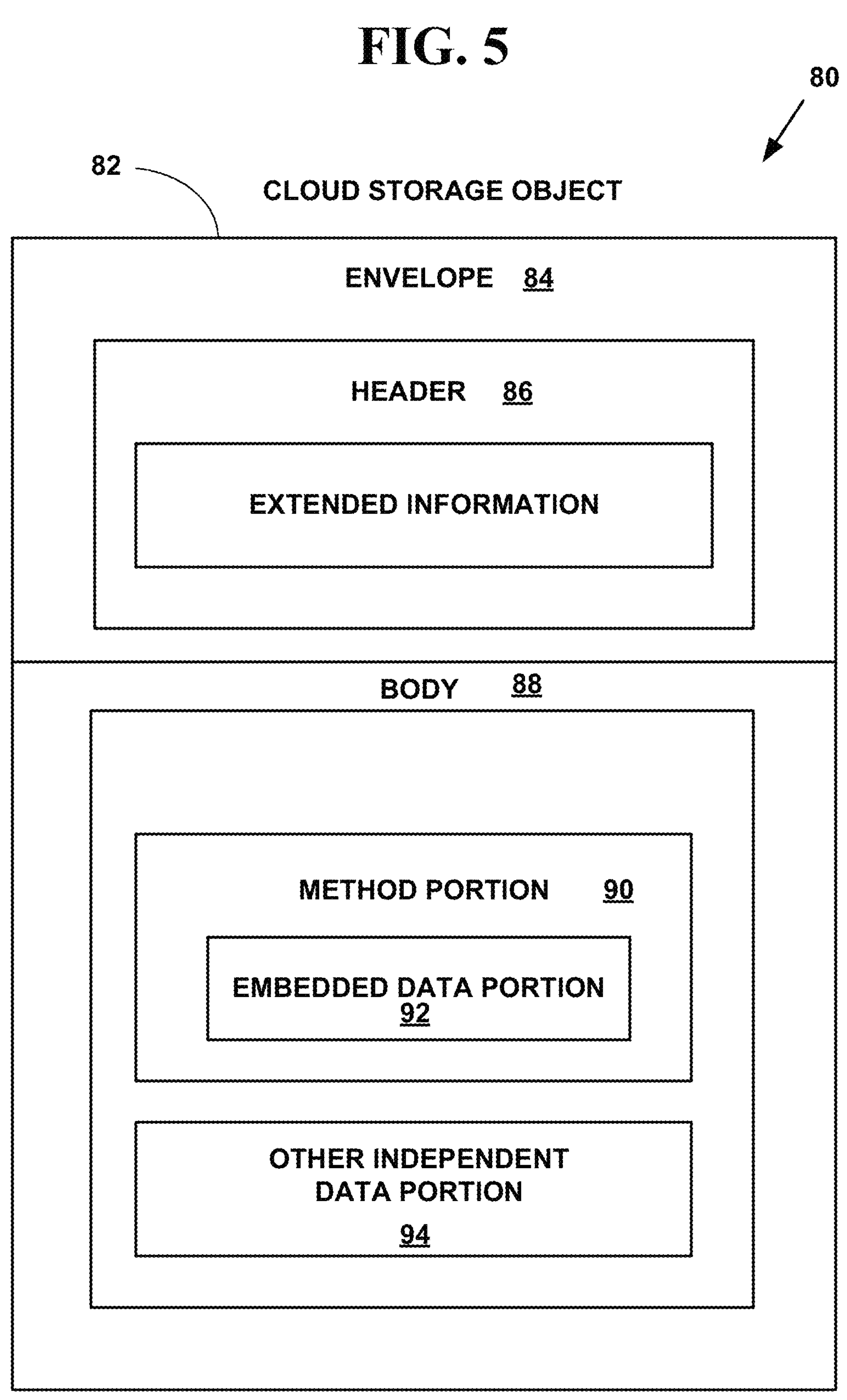
FIG. 5 is a block diagram illustrating an exemplary cloud storage object.

FIG. 5 is a block diagram 80 illustrating an exemplary cloud storage object 82. One or more server network devices (e.g., 20, 22, 24, 26, etc.) store portions 13', 15' of the electronic message content 13, 15 (e.g., SMS, MMS, RCS, DM, IM, social media, network protocol, telephony, etc., etc.) as cloud storage objects 82 (FIG. 5) as is described herein.

The cloud storage object 82 includes an envelope portion 84, with a header portion 86, and a body portion 88. However, the present invention is not limited to such a cloud storage object 82 and other cloud storage objects and other cloud storage objects with more, fewer or other portions can also be used to practice the invention.

The envelope portion 84 uses unique namespace Uniform Resource Identifiers (URIs) and/or Uniform Resource Names (URNs), and/or Uniform Resource Locators (URLs) unique across the cloud communications network 18 to uniquely specify, location and version information and encoding rules used by the cloud storage object 82 across the whole cloud communications network 18. For more information, see IETF RFC-3305, Uniform Resource Identifiers (URIs), URLs, and Uniform Resource Names (URNs), the contents of which are incorporated by reference.

The envelope portion 84 of the cloud storage object 82 is followed by a header portion 86. The header portion 86 includes extended information about the cloud storage objects such as authorization and/or transaction information, etc.

The body portion 88 includes methods 90 (i.e., a sequence of instructions, etc.) for using embedded application-specific data in data elements 92. The body portion 88 typically includes only one portion of plural portions of application-specific data 92 and independent data 94 so the cloud storage object 82 can provide distributed, redundant fault tolerant, security and privacy features described herein.

Cloud storage objects 82 have proven experimentally to be a highly scalable, available and reliable layer of abstraction that also minimizes the limitations of common file systems. Cloud storage objects 82 also provide low latency and low storage and transmission costs.

Cloud storage objects 82 are comprised of many distributed resources, but function as a single storage object, are highly fault tolerant through redundancy and provide distribution of desired electronic content across public communication networks 76, and one or more private networks 72, community networks 74 and hybrid networks 78 of the cloud communications network 18. Cloud storage objects 82 are also highly durable because of creation of copies of portions of desired electronic content across such networks 72, 74, 76, 78 of the cloud communications network 18. Cloud storage objects 82 includes one or more portions of desired electronic content and can be stored on any of the 72, 74, 76, 78 networks of the cloud communications network 18. Cloud storage objects 82 are transparent to a requester of desired electronic content and are managed by cloud applications 30, 30*a*, 30*b*, 30*c*, 30*d*.

In one embodiment, cloud storage objects 82 are configurable arbitrary objects with a size up to hundreds of terabytes, each accompanied by with a few kilobytes of metadata. Cloud objects are organized into and identified by a unique identifier unique across the whole cloud communications network 18. However, the present invention is not limited to the cloud storage objects described, and more fewer and other types of cloud storage objects can be used to practice the invention.

Cloud storage objects 82 present a single unified namespace or object-space and manages desired electronic content by user or administrator-defined policies storage and retrieval policies. storage objects include Representational state transfer (REST), Simple Object Access Protocol (SOAP), Lightweight Directory Access Protocol (LDAP) and/or Application Programming Interface (API) objects and/or other types of cloud storage objects. However, the present invention is not limited to the cloud storage objects described, and more fewer and other types of cloud storage objects can be used to practice the invention.

REST is a protocol specification that characterizes and constrains macro-interactions storage objects of the four components of a cloud communications network 18, namely origin servers, gateways, proxies and clients, without imposing limitations on the individual participants.

SOAP is a protocol specification for exchanging structured information in the implementation of cloud services with storage objects. SOAP has at least three major characteristics: (1) Extensibility (including security/encryption, routing, etc.); (2) Neutrality (SOAP can be used over any transport protocol such as HTTP, SMTP or even TCP, etc.), and (3) Independence (SOAP allows for almost any programming model to be used, etc.)

LDAP is a software protocol for enabling storage and retrieval of electronic content and other resources such as files and devices on the cloud communications network 18. LDAP is a "lightweight" version of Directory Access Protocol (DAP), which is part of X.500, a standard for directory services in a network. LDAP may be used with X.509 security and other security methods for secure storage and retrieval. X.509 is public key digital certificate standard developed as part of the X.500 directory specification. X.509 is used for secure management and distribution of digitally signed certificates across networks.

An API is a particular set of rules and specifications that software programs can follow to communicate with each other. It serves as an interface between different software programs and facilitates their interaction and provides access to automatic online dynamic digital indicator for skill set assessment processing services in a cloud or non-cloud environment. In one embodiment, the API for online dynamic digital indicator for skill set assessment processing services is available to network devices 12, 14, 16, 20, 22, 24, 26, 31, 33, 98-104 and networks 18, 18'. However, the present invention is not limited to such an embodiment and other embodiments can be used to practice the invention.

Wearable Devices

Wearable technology" and/or "wearable devices" are clothing and accessories incorporating computer and advanced electronic technologies. Wearable network devices provide several advantages including, but not limited to: (1) Quicker access to notifications. Important and/or summary notifications are sent to alert a user to view the whole message. (2) Heads-up information. Digital eye wear allows users to display relevant information like directions without having to constantly glance down; (3) Always-on Searches. Wearable devices provide always-on, hands-free searches; and (4) Recorded data and feedback. Wearable devices take telemetric data recordings and providing useful feedback for users for exercise, health, fitness, etc. activities.

Figure 6:
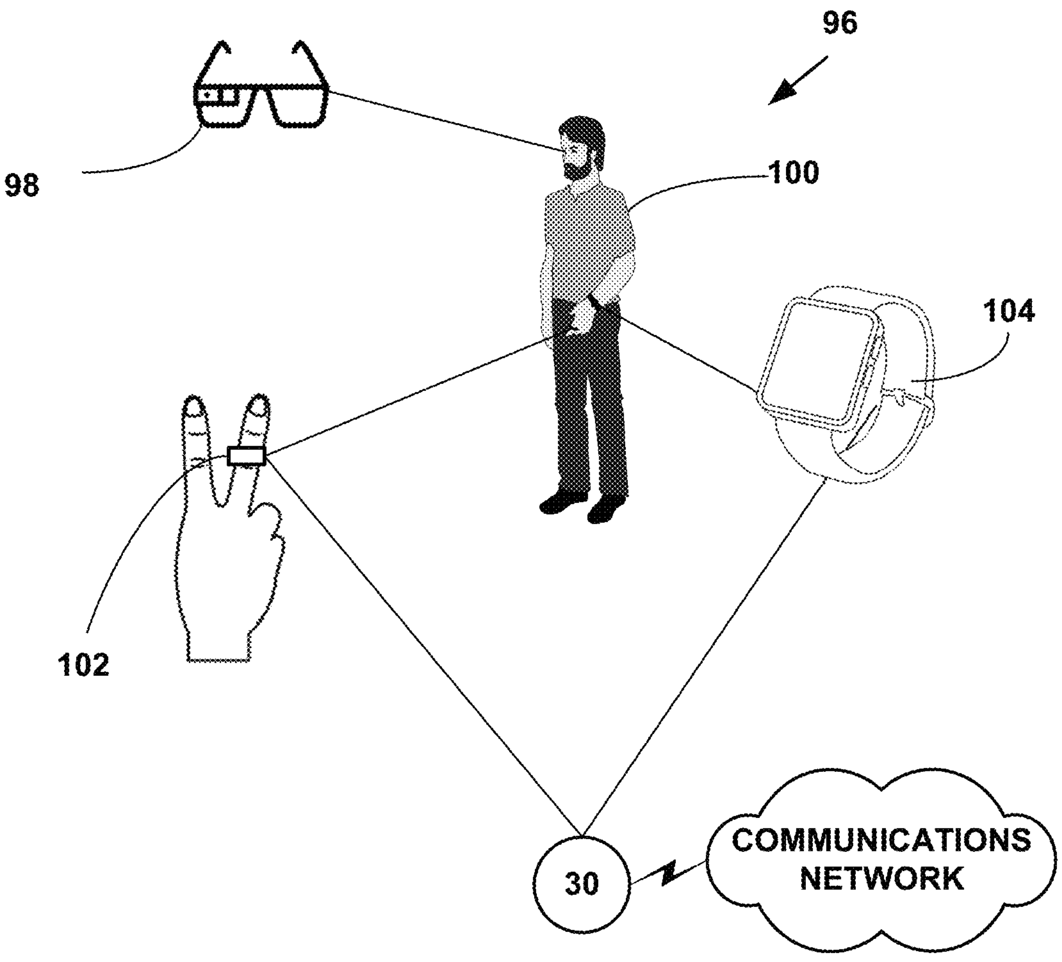
FIG. 6 is a block diagram illustrating wearable network devices.

FIG. 6 is a block diagram with 96 illustrating wearable devices. The wearable devices include one or more processors and include, but are not limited to, wearable digital glasses 98, clothing 100, jewelry 102 (e.g., smart rings, smart earrings, etc.) and/or watches 104. However, the present invention is not limited to such embodiments and more, fewer and other types of wearable devices can also be used to practice the invention.

In one specific embodiment, the application 30, 30*a*, 30*b*, 30*c*, 30*d*, 30*e*, 30*f* interacts with wearable devices 98-104 automatic online dynamic digital indicator for skill set assessment processing services the methods described herein. However, the present invention is not limited this embodiment and other embodiments can also be used to practice the invention.

Artificial Intelligence (AI) and Big Data

"Artificial intelligence" (AI), also known as machine intelligence (MI), is intelligence demonstrated by machines, in contrast to the natural intelligence (NI) displayed by humans and other animals. AI research is defined as the study of "intelligent agents." Intelligent agents are any software application or hardware device that perceives its environment and takes actions that maximize its chance of successfully achieving its goals. Colloquially, the term "artificial intelligence" is applied when a machine mimics "cognitive" functions that humans associate with human brains, such as learning, problem solving and comparing large number of data points.

In one embodiment, the present invention uses one or more AI methods including, but are not limited to, AI knowledge-based methods 30*c* for (1) dynamic digital indicator for skill set assessment interoperability services. In one embodiment, the AI application 30*c* includes AI for using a dynamic digital indicator for skill set assessment selection system. In one embodiment, the AI application 30*c* includes a selected AI method to test and evaluate a desired skill set (e.g., tech, legal, medical, accounting, etc.) of a user and provides a feedback loop to accurately evaluate and guide knowledge skills updates and learning of new skills. In one embodiment, the AI application 30*c* further includes a selected AI method on the server digital indicator processing application the server network device to circumvent hacking, the AI method including a collection of known hacking and spoofing techniques used by hackers that is periodically and continuously updated by the AI application 30*c*.

However, the present invention is not limited to such an embodiment and more, fewer and/or other AI methods can be used to practice the invention.

In one embodiment, SaaS 64 includes and AI application 30*c* with the AI methods described herein. In another embodiment, the AI application 30*c* is a standalone application. However, the present invention is not limited to such an embodiment, and the AI application 30*c* can be provided in other than the SaaS 64.

"Big Data" refers to the use of predictive analytic methods that extract value from data, and to a particular size of data set. The quantities of data used are very large, at least 100,000 data points and more typically 500,000 to 1 Million+ data points. Analysis of Big Data sets are used to find new correlations and to spot trends. In one embodiment, SaaS 64 includes and Big Data application 30*d* with the Big Data described herein.

In one embodiment, the AI methods described herein collect data information to create and store (e.g., in cloud storage object 82, etc.) a Big Data that is used to analyze trends find new correlations and to spot trends. However, the present invention is not limited to such an embodiment and the AI methods described herein can be used without Big Data sets.

Short Message Service (SMS) Messaging

Short Message Service (SMS) is an electronic text messaging service component of phone, Web, or mobile communication systems. It uses standardized communications protocols to allow fixed line or mobile phone devices to exchange short text messages.

SMS messages were defined in 1985 as part of the Global System for Mobile Communications (GSM) series of standards as a means of sending messages of up to 160 characters to and from GSM mobile handsets. Though most SMS messages are mobile-to-mobile text messages, support for the service has expanded to include other mobile technologies as well as satellite and landline networks.

The SMS Internet Engineering Task Force (IETF) Request for Comments (RFC) 5724, ISSN: 2070-1721, 2010, is incorporated herein by reference.

Direct Messages (DM) and Instant Messages (IM)

A "direct message" (DM) is a private form of communication between social media users that is only visible to the sender and recipient(s). INSTAGRAM, TWITTER, FACEBOOK and other platforms, allow for direct messages between their users, with varying restrictions by platform.

An "instant message" (IM) is a type of online chat allowing real-time text transmission over the Internet or another computer network. Messages are typically transmitted between two or more parties, when each user inputs text and triggers a transmission to the recipient, who are all connected on a common network.

Multimedia Messaging Service (MMS)

Multimedia Messaging Service (MMS) is a standard way to send messages that include multimedia content to and from a mobile phone over a cellular network. Users and providers may refer to such a message as a PXT, a photograph message, and/or a multimedia message.

The MMS Internet Engineering Task Force (IETF) Request for Comments (RFC) 4355 and 4356, are incorporated herein by reference.

Rich Communication Suite (RCS)

Rich Communications Suite/Rich Communications System (RCS) is a communication protocol between mobile telephone carriers, between phones and carriers, and between individual devices aiming at replacing SMS messages with a message system that is richer, provides phonebook polling (e.g., for service discovery, etc.), and can transmit in-call multimedia. It is also marketed under the names of Advanced Messaging, Advanced Communications, Chat, joyn, Message+ and SMS+. RCS is also a communication protocol available for device-to-device (D2D) exchanges without using a telecommunications carrier for devices that are in close physical proximity (e.g., between two IoT devices, smart phones, smart phone and electronic tablet, etc.)

One advantage RCS Messaging has over SMS is that RCS enables users to send rich, verified messages including photos, videos and audio messages, group messages, read receipts, indicators to show other users are typing a message, carousel messages, suggested chips, chat bots, barcodes, location integration, calendar integration, dialer integration, and other RCS messaging features. RCS messaging includes person-to-person (P2P), application-to-person (A2P), application-to-application (A2A), application-to-device (A2D) and/or device-to-device (D2D) messaging.

The RCS Interworking Guidelines Version 14.0, 13-10-2017, GSM Association, Rich Communication Suite RCS API Detailed Requirements, version 3.0, Oct. 19, 2017, Rich Communication Suite 8.0 Advanced Communications Services and Client Specification Version 9.0, 16-5-2018, RCS Universal Profile Service Definition Document Version 2.2, 16-5-2018, and Rich Communication Suite Endorsement of OMA CPM 2.2 Conversation Functions Version 9.0, 16-10-2019, are all incorporated herein by reference.

The Rich Communication Suite-Enhanced (RCS-e) includes methods of providing first stage interoperability among Mobile Network Operators (MNOs). RCS-e is a later version of RCS which enables mobile phone end users to use instant messaging (IM), live video sharing and file transfer across any device on any MNO.

The RCS functionality of the present invention includes, but is not limited to, one and two way, rich, verified, multimedia messages including photos, videos and audio messages, group messages, read receipts, indicators to show other users are typing a message, predefined quick-reply suggestions, rich cards, carousels, action buttons, maps, click-to-call, calendar integration, geo-location, etc. The RCS functionality also includes RCS emulators and/or thin RCS applications that provide full and/or selected features of available RCS functionality. The RCS message application and the RCS interoperability application provides full and/or partial RCS functionality including, but not limited to, RCS-e functionality.

The RCS functionality of the present invention also includes selected portions of RCS functionality used in message application and the RCS interoperability application. However, the present invention is not limited to such embodiments.

Dynamic Digital Indicators for Skill Set Assessment Systems

There are many education systems where graphical symbols and digital indicators are used to designate a user achieving a desired skill set assessment level.

For example, for the completion of skill set assessment including, but not limited to, professional continuing education skill set assessment (e.g., for medical professionals, lawyers, accountant, insurance professionals, police, fire, paramedics, emergency medical technicians (EMTs), etc.).

In addition, graphical symbols and digital indicators are issued for skill set assessment, including, but not limited to, academic skill set assessments such as advance placement skill set assessments, athletic skill set assessments, art skill set assessments, language skill set assessments, math skill set assessments, martial arts assessments, music assessments, etc. where proficiency and skills are developed over time.

FIGS. 7A and 7B are a flow diagram illustrating a Method 130 for dynamic digital indicator processing for skill set assessment systems.

In FIG. 7A a Step 132, receiving a first assessment message on a server digital indicator processing application on a server network device with one or more processors from a skills assessment application on a network device with one or more processors via a communications network, the first assessment message including: skill set assessment results for a user, a type of skill set assessed, a level of skill set completed, an expiration time and date for the type of skill set assessment completed and level of skill assessment completed, a unique identifier for the user who completed the skill set assessment and an identifier for the network device; At Step 134, selecting a digital indicator on the server digital indicator processing application on the server network device based on the type of type of skill set assessment completed included in the first assessment message; At Step 136, selecting a first skill assessment indicator on the server digital indicator processing application on the server network device for the digital indicator indicating the level of skill assessment completed included in the first assessment message; At Step 138, creating a digital security identifier on the server digital indicator processing application on the server network device including the selected digital indicator, the selected first skill assessment indicator, the type of skill set assessment indicator completed, the level of skill set assessment completed, the expiration time and date for the type of skill set assessment completed and level of skill set assessment completed, the unique identifier for the user who completed the skill set assessment and the identifier for the network device; In FIG. 7B at Step 140, creating from the server digital indicator processing application on the server network device a database entry in a database for the created digital security identifier including: the skill set assessment results for the user, the selected digital indicator, the selected first skill set assessment indicator, the type of skill set assessment completed, the level of skill set assessment completed, the expiration time and date for the type of skill set assessment completed and the level skill set assessment completed, the unique identifier for the user who completed the skill set assessment and the identifier for the network device; At Step 142, sending a secure link from the server digital indicator processing application on the server network device to the skills assessment application on the network device via the communications network including the created digital security identifier to access the selected digital indicator with the selected first skill assessment indicator on the network device; At Step 144, receiving a link selection message from the secure link on server digital indicator processing application on the server network device from the network device via the communications network, the link selection message including the created digital security identifier; At Step 146, conducting a database query on the server digital indicator processing application on the server network device with the created digital security identifier received in the link selection message to obtain the database entry including the created digital security identifier; and at Step 148, sending securely from server digital indicator processing application on the server network device the selected digital indicator with the selected first skill assessment indicator to the network device via the communications network for display on the network device, the selected digital indicator with the selected first skill assessment indicator indicating the type of skill set assessment completed and the level of skill set assessment completed by the user.

FIG. 12 is a block diagram 184 illustrating a skill assessment message data structure 184 for dynamic digital indicator processing for skill set assessment systems. This data structure includes the first assessment message 13*a*/15*a* of FIG. 7A and second assessment message 13*b*/15*b* of FIG. 8. The skill assessment message data structure 184 includes a data field for skills set assessment results 185, a type of skill set assessment completed 186, a level of skill set assessment completed 188, an expiration time and date 190 for the type of skill set assessment completed 186 and level of skill set assessment completed 188, a unique identifier 192 for a user 19 who completed the type of skill set assessment 186, an identifier 194 for a network device 12, 14, 16, 20, 22, 24, 26, 31, 33, 98-104 with one or more processors.

Method 130 is illustrated with an exemplary embodiment. However, the present invention is not limited to this exemplary embodiment and other embodiments can be used to practice the invention.

In such an exemplary embodiment in FIG. 7A at Step 132, receiving a first assessment message 13*a*/15*a* on a server digital indicator processing application 30*a* on a server network device 20, 22, 24, 26 with one or more processors from skills assessment application 30 on a network device 12, 14, 16, 20, 22, 24, 26, 31, 33, 98-104 with one or more processors via a communications network 18, 18', the first assessment message 13*a*/15*a* including: skill set assessment results 185 for the user 19, a type of skill set assessed 186, a level of skill set completed 188, an expiration time and date 190 for the type of skill set assessment completed 186 and level of skill assessment completed 188, a unique identifier 192 for a user 19 who completed the skill set assessment and an identifier 194 for the network device 12, 14, 16, 20, 22, 24, 26, 31, 33, 98-104.

In one embodiment, the skills assessment application 30 on the network device 12, 14, 16, 20, 22, 24, 26, 31, 33, 98-104 includes one or more methods to dynamically measure, improve and convey skill levels of users 19 including the measurement, improvement and conveying of micro-skills over time. The one or methods further include methods to test and evaluate a desired skill set (e.g., tech, legal, medical, accounting, etc.) of a user and provides a feedback loop to accurately evaluate and guide knowledge skills updates and learning of new skills The one or more methods further include learning-based models that evaluate a user 19 taking into account the learning environment of the use including loss of skills due to forgetting over time, forgetting due to distractions in the learning environment (e.g., noise, texting, social media, etc.), advancing age, etc. However, the present invention is not limited to such embodiments and other evaluation methods and other embodiments can be used to practice the invention.

In one embodiment, the one or more methods used on the skills assessment application 30 on the network device 12, 14, 16, 20, 22, 24, 26, 31, 33, 98-104 includes evaluating a skill set being lost to forgetting over time includes, but is not limited to, a method including learning theory called the "Ebbinghaus Forgetting Curve" by Hermann Ebbinghaus, the contents of which are incorporated by reference. However, the present invention is not limited to such an embodiment and other methods related to memory and/or forgetting can be used to practice the invention.

Hermann Ebbinghaus (1850-1909) was a German psychologist who founded the experimental psychology of memory. Ebbinghaus' research on memory was groundbreaking at the time and is still valid and is used in modern psychology and technology-based learning.

In one embodiment, the skills assessment application 30 on the network device 12, 14, 16, 20, 22, 24, 26, 31, 33, 98-104 further includes the AI application 30*c* with one or more selected AI methods to test and evaluate a desired skill set (e.g., tech, legal, medical, accounting, etc.) of a user and provides a feedback loop to accurately evaluate and guide knowledge skills updates and learning of new skills. The selected AI methods include dynamically measure, improve and convey skill levels of users 19 including the measurement, improvement and conveying of micro-skills over time. The selected AI methods include learning-based models that evaluate a user 19 taking into account the learning environment of the use including loss of skills due to forgetting over time, forgetting due to distractions in the learning environment (e.g., noise, texting, social media, etc.), advancing age, etc. However, the present invention is not limited to such embodiments and other AI methods and AI embodiments can be used to practice the invention.

In one embodiment, the first assessment message includes, but is not limited to an e-mail, Short Message Service (SMS), Multimedia Message Services (MMS), Rich Communications Service (RCS), Direct Message (DM), Instant Message (IM), social media, network protocol (e.g., IP, etc.) and/or telephony first assessment message. However, the present invention is not limited to these embodiments and more, fewer and/or other types of messages can be used to practice the invention.

In one embodiment, the network device is a target network device 12, 14, 16, 31, 33, 98-104 with one or more processors and a non-transitory computer readable medium. In another embodiment the network device includes a server network device 20, 22, 24, 26, with one or more processors and a non-transitory computer readable medium (e.g., a web-site on the Internet, LAN, cloud network, etc.). However, the present invention is not limited to such an embodiment and other embodiments can be used to practice the invention.

In one embodiment, a user 19 uses a server network device 20, 22, 24, 26 directly (e.g., at a testing site, school, college, university, etc.) to complete Method 130. However, the present invention is not limited to such embodiments and other embodiments may be used to practice the invention.

In one embodiment, the type of skill set assessment completed 186 and level of skill set assessment completed 188 include a type of professional license and a level of professional license completed. For example, the type of professional license includes, medical doctor, dentist, nurse, lawyer, accountant, etc. and the level of professional license completed includes board certified medical doctor or dentist, a registered nurse, a patent lawyer, a certified public accountant, etc. However, the present invention is not limited to such embodiments and other embodiments may be used to practice the invention.

In one embodiment, the first assessment message 13*a*/15*a* includes a unique identifier 192 of a user 19, a unique identifier 194 for the network device, which is a target network device 12, 14, 16, 20, 22, 24, 26, 31, 33, 98-104 and/or another server network device 22, 24, 26, each with one or more processors. However, the present invention is not limited to embodiments and other embodiments can be used to practice the invention.

In one embodiment, the unique identifier 192 of the user 19, includes, but is not limited to, a user name, telephone number, email identifier, social media identifier, a combination thereof, and/or other unique identifier for the user 19. However, the present invention is not limited to embodiments and other embodiments can be used to practice the invention.

In one embodiment, the identifier for the network device 12, 14, 16, 20, 22, 24, 26, 31, 98-104, includes, but is not limited to, a domain name, network address (e.g., IP address, etc.) a telephone number, MAC number, serial number, an International Mobile Equipment Identity (IMEI), a Mobile Identification Number (MIN), an Integrated Circuit Card Identifier (ICCID) associated with a Subscriber Identity Module (SIM) card, SIM card identifier, a combination thereof, or other types of identifiers for the network device. A SIM (Subscriber Identity Module) card is a small, removable chip that stores information about your phone and network plan:

In one embodiment, the server digital indicator processing application 30*a* on the server network device 20, 22, 24, 26 and the skills assessment application 30 on the network device 12, 14, 16, 20, 22, 24, 26, 31, 33, 98-104 are cloud SaaS 64 services. However, the present invention is not limited to embodiments and other embodiments can be used to practice the invention.

Returning to FIG. 7A at Step 134, selecting a digital indicator 17 on the server digital indicator processing application 30*a* on the server network device 20, 22, 24, 26 based on the type of type of skill set assessment 186 completed included in the first assessment message 13*a*/15*a*.

Figure 10:
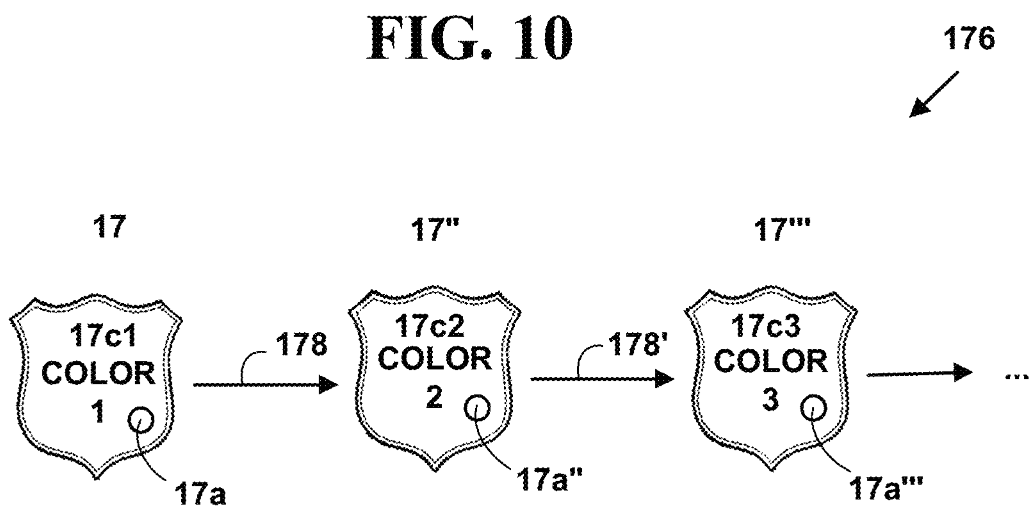
FIG. 10 is a block diagram illustrating a dataflow for dynamic digital indicator processing for v systems.
Figure 11:
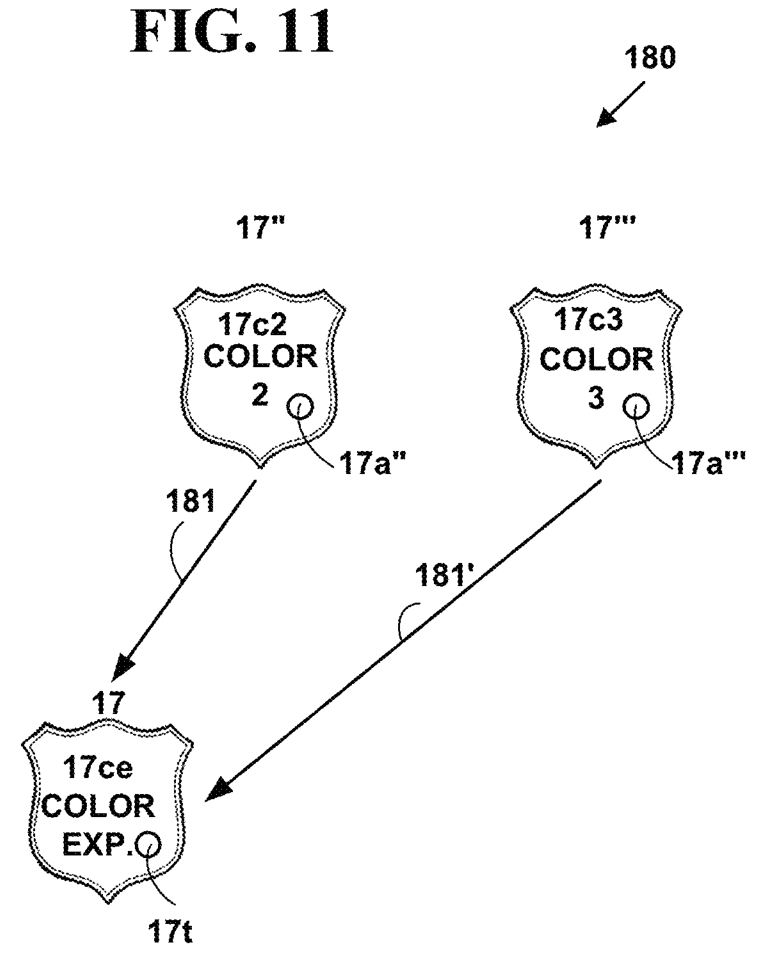
FIG. 11 is a block diagram illustrating a dataflow for dynamic digital indicator processing for skill set assessment systems.

The digital indicator 17 is illustrated as a graphical shield in FIGS. 1 and 10-11. However, the digital indicator 17 also includes graphical, text, audio, visual, haptic and/or other digital indicators. A haptic digital indicator relates to a sense of touch of a user, in particular relating to the perception and manipulation of objects using the senses of touch (e.g., a buzzer felt by fingers, etc.) and proprioception. For example, a medical doctor practicing a surgical technique, a nurse practicing inserting a needle, may include a haptic digital indicator, etc. However, the present invention is not limited to such digital indicators 17 and other digital indicators can be used to practice the invention.

In one embodiment, the skill set assessments include professional continuing education assessments (e.g., for medical professionals, lawyers, accountant, insurance professionals, police, fire, etc.). In another embodiment the skill set assessments, include academic assessments such as advance placement assessments, athletic assessments, art assessments, language assessments, math assessments, martial arts assessments, music assessments, etc. where proficiency and skills are developed over time. However, the present invention is not limited to such embodiments and other embodiments can be used to practice the invention.

In one embodiment, for illustrative purposes only, to clearly explain the invention, the digital indicator 17 includes a graphical icon 17 including a skill set assessment indicator that changes colors. However, the present invention is not limited to such an embodiment and other embodiments may be used to practice the invention.

At Step 136, selecting a first skill assessment indicator (e.g., first color 17*cl*, FIG. 10, etc.) on the server digital indicator processing application 30*a* on the server network device 20, 22, 24, 26 for the digital indicator 17 indicating the level of skill assessment (e.g., skill level 1, etc.) completed included in the first assessment message 13*a*/15*a*.

In one embodiment, the first skill assessment indicator that changes in a visual (e.g., size, shape, color, etc.) audio, video, text and/or haptic manner. However, the present invention is not limited to such an embodiment and other embodiments may be used to practice the invention.

For example, if the skill set assessment indicator includes three levels, the colors, bronze, silver and gold are used. A first color, bronze 17*c*1, may be selected. If the skill set assessment includes four levels, orange, yellow, green, blue etc., a first color, orange (e.g., 17*cl*, etc.) may be selected, etc. However, the present invention is not limited to such an embodiment and other embodiments with other digital indicators and other first skill assessment indicators. can be used to practice the invention.

At Step 138, creating a digital security identifier 17*a* on the server digital indicator processing application 30*a* on the server network device 20, 22, 24, 26 including the selected digital indicator 17, the selected first skill assessment indicator 17*c*1, the type of skill set assessment completed 186, the level of skill set assessment completed 188, the expiration time and date 190 for the type of skill set assessment completed 186 and level of skill set assessment completed 188, the unique identifier 192 for the user 19 who completed the skill set assessment and the identifier 194 for the network device 12, 14, 16, 20, 22, 24, 26, 31, 98-104. The created digital security identifier 17*a* prevents altering by the user 19 and/or altering by other third parties.

In one embodiment, the created digital security identifier 17*a* includes a digital signature, a hash code, a message digest code, (e.g., MD5, etc.), an encrypted, a Secure Sockets Layer (SSL) certificate, an encrypted user identifier comprising: the selected digital indicator 17, the selected first color the identifier 17*cl* for the user 19 who completed the completed the type of skill set assessment 186 and level of skill set assessment 188, the identifier for the network device 194 and the unique user identifier 194 and/or other types of digital security identifiers. However, the present invention is not limited to such embodiments and other embodiments may be used to practice the invention.

In one embodiment, the created digital security identifier 17*a* is encrypted. In another embodiment the created digital security identifier 17*a* is plaintext.

In FIG. 7B at Step 140, creating from the server digital indicator processing application 30*a* on the server network device 20, 22, 24, 26 a database entry in a database 20', 22' 24' 2'6 for the created digital security identifier 17*a* including: the skill set assessment results 185 for the user 19 the selected digital indicator 17, the selected first skill set assessment indicator 17*c*1, the type of skill set assessment completed 186, the level of skill set assessment completed 188, the expiration time and date 190 for the type of skill set assessment completed 186 and the level of skill set assessment completed 188, the unique identifier 192 for the user 19 who completed the skill set assessment and the identifier 194 for the network device 12, 14, 16, 20, 22, 24, 26, 31, 98-104.

In one embodiment, the database entry includes, but is not limited to, one or more cloud storage objects 82 stored in one more cloud databases 20', 22', 24', 26'. In another embodiment, the database entry includes a blockchain entry in a blockchain. However, the present invention is not limited to such an embodiment and other embodiments with other colors can be used to practice the invention.

A "blockchain" is a public ledger of all transactions that have ever been executed. It is constantly growing as completed blocks are added to it with a new set of recordings. The blocks are added to the blockchain in a linear, chronological order. Blockchains are used on Peer-2-Peer (P2P) networks and other networks 18' such as cloud communications networks 18. Each P2P node gets a copy of the blockchain, which gets downloaded automatically upon joining P2P. The blockchain has complete information about the block owners and block content right from the first block to the most recently completed block.

A "blockchain is also a digital ledger that records every transaction that has ever occurred. Blockchains and transactions on blockchains are typically protected by cryptography. More importantly, though, the blockchain does not reside in a single server, but across a distributed network of servers and computer such as a cloud computing network and a P2P computing network. Accordingly, whenever new transactions occur, a new blockchain is authenticated across this distributed network, then the transaction is included as a new "block" on the "chain." A block chain implementation comprises of two kinds of records: transactions and blocks.

Step 142, sending a secure link S1 from the server digital indicator processing application 30*a* on the server network device 20, 22, 24, 26 to the skills assessment application 30 on the network device 12, 14, 16, 20, 22, 24, 26, 31, 33, 98-104 via the communications network 18, 18' including the created digital security identifier 17*a* to access the selected digital indicator 17 with the selected first skill assessment indicator 17*cl* on the network device 12, 14, 16, 20, 22, 24, 26, 31, 98-104.

In one embodiment, the secure electronic link S1 is controlled by the server digital indicator processing application 30*a* on the server network device 20, 22, 24, 26 and the server digital indicator processing application 30*a* is able to dynamically change a type, color, shape, size, sound, video, text, haptic event of the digital indicator 17 on the network device 12, 14, 16, 20, 22, 24, 26, 31, 33, 98-104 via the communications network 18, 18' without input or interaction with the skills assessment application 30 on the network device 12, 14, 16, 20, 22, 24, 26, 31, 98-104. However, the present invention is not limited to such an embodiment and other embodiments can be used to practice the invention.

In one embodiment, the secure electronic link S1 includes a secure electronic link to an electronic data tree in which plural different skill set assessment identifiers are stored for the user 19. However, the present invention is not limited to such an embodiment and other embodiments can be used to practice the invention.

In one embodiment, the secure electronic link S1 includes, but is not limited to, taking an electronic link (e.g., a Uniform Resource Locator (URL), etc.), scanning and rewriting of secure electronic link and replacing the electronic entire link with a shorter series of unique numbers and letters. In one embodiment, these shortcuts are permanent and cannot be changed once they are created. In another embodiment, these shortcuts are dynamic and can be changed. During data flow, real-time time-of-click verification of URLs is used in the secure electronic links and this provides anti-spam and anti-malware protection for the secure electronic link. However, the present invention is not limited to such an embodiment and other types of secure electronic links can be used to practice the invention.

In one embodiment, an AI application 30*c* on the server digital indicator processing application 30*a* on the server network device 20, 22, 24, 26 creates the digital security identifier 17*a* and/or secure electronic link S1 using an AI method to circumvent hackers including a collection of known hacking and/or spoofing techniques used by hackers. However, the present invention is not to this embodiment and the present invention can be practice with and/or without AI methods.

In another embodiment, secure electronic link S1 includes a file (e.g., graphical, audio, video, text, haptic, etc.) including the digital indicator 17 is sent back to the skills assessment application 30 on the network device 12, 14, 16, 20, 22, 24, 26, 31, 33, 98-104 via the communications network 18, 18'. In such an embodiment, the file includes security features (e.g., an SSL certificate, hash code, message digest code, encrypted user identifier, the created digital security identifier 17*a*, etc.) to prevent tampering and includes an expiration time and date. However, the present invention is not limited to such an embodiment and other embodiments can be used to practice the invention.

For example, if a doctor has a completed a skill set assessment for a medical specialty and is required to complete such a skill set assessment each year to remain board certified, then the secure electronic link S1 and/or the secure electronic link S1 with a file includes a time and date 190 when the type of skill set assessment completed 186, the level of skill set assessment class completed 188, expires, etc. However, the present invention is not limited to such embodiments and other embodiments can be used to practice the invention.

At Step 144, receiving a link selection message 13L/15L from the secure link S1 on the server digital indicator processing application 30*a* on the server network device 20, 22, 24, 26 from the network device 12, 14, 16, 20, 22, 24, 26, 31, 33, 98-104 via the communications network 18, 18', the link selection message 13L/15L including the created digital security identifier 17*a*.

At Step 146, conducting a database query on the server digital indicator processing application 30*a* on the server network device 20, 22, 24, 26 with the created digital security identifier 17*a* received in the link selection message to obtain the database entry including the created digital security identifier 17*a*.

At Step 148, sending securely from server digital indicator processing application 30*a* on the server network device 20, 22, 24, 26 the selected digital indicator 17 with the selected first skill assessment indicator 17*cl* to the network device 12, 14, 16, 20, 22, 24, 26, 31, 33, 98-104 via the communications network 18, 18' for display on the network device 12, 14, 16, 20, 22, 24, 26, 31, 33, 98-104, the selected digital indicator 17 with the selected first skill assessment indicator 17*cl* indicating the type of skill set assessment completed 186 and the level of skill set assessment completed 188 by the user.

Figure 8:
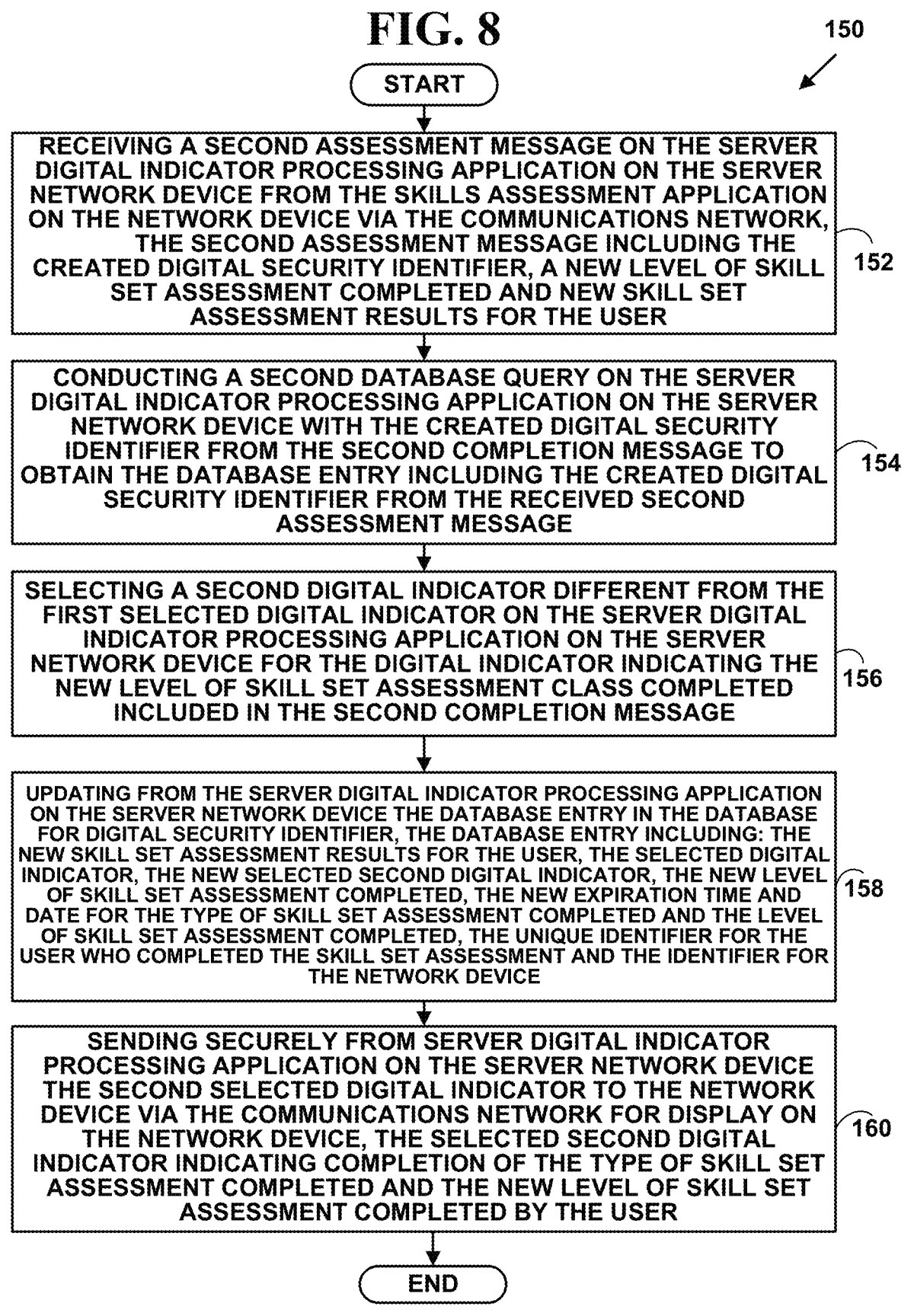

FIG. 8 is a flow diagram illustrating a Method 150 for dynamic for dynamic digital indicator processing for skill set assessment systems.

In FIG. 8 at Step 152, receiving a second assessment message on the server digital indicator processing application on the server network device from the skills assessment application on the network device via the communications network, the second assessment message including the created digital security identifier, a new level of skill set assessment completed and a new skill set assessment results for a user; At Step 154, conducting a second database query on the server digital indicator processing application on the server network device with the created digital security identifier from the second completion message to obtain the database entry including the created digital security identifier from the received second assessment message; At Step 156, selecting a second digital indicator different from the first selected digital indicator on the server digital indicator processing application on the server network device for the digital indicator indicating the new level of skill set assessment completed included in the second completion message; At Step 158, updating from the server digital indicator processing application on the server network device the database entry in the database for digital security identifier, the database entry including: the new skill set assessment results for the user, the selected digital indicator, the new selected second digital indicator, the new level of skill set assessment completed, the new expiration time and date for the type of skill set assessment completed and the level of skill set assessment completed, the unique identifier for the user who completed the skill set assessment and the identifier for the network device; and at Step 160, sending securely from server digital indicator processing application on the server network device the second selected digital indicator to the network device via the communications network for display on the network device, the selected second digital indicator indicating completion of the type of skill set assessment completed and the new level of skill set assessment completed by the user.

Method 150 is repeatedly executed as many times as there are levels for the skill set assessment.

Method 150 is illustrated with an exemplary embodiment. However, the present invention is not limited to this exemplary embodiment and other embodiments can be used to practice the invention.

In such an exemplary embodiment in FIG. 8 at Step 152, receiving a second assessment message 13*b*/15*b* on the server digital indicator processing application 30*a* on the server network device 20, 22, 24, 26, from the skills assessment application 30 on the network device 12, 14, 16, 20, 22, 24, 26, 31, 33, 98-104 via the communications network 18, 18', the second assessment message 13*b*/15*b* including the created digital security identifier 17, a new level of skill set assessment completed 188' and the new skill set assessment results 185' for the user 19.

At Step 154, conducting a second database query on the server digital indicator processing application 30*a* on the server network device 20, 22, 24, 26 with the created digital security identifier 17*a* from the second completion message 13*b*/15*b* to obtain the database entry including the created digital security identifier 17*a* from the received second assessment message 13*b*/15*b*.

At Step 156, selecting a second digital indicator 17*c*2 different from the first selected digital indicator 17*cl* on the server digital indicator processing application 30*a* on the server network device 20, 22, 24, 26 for the digital indicator 17 indicating the new level of skill set assessment completed 186' included in the second completion message 13*b*/15*b*.

At Step 158, updating from the server digital indicator processing application 30*a* on the server network device 20, 22, 24, 26 the database entry in the database for digital security identifier 17, the database entry including: the new skill set assessment results 185' for the user 19, the selected digital indicator 17, the new selected second digital indicator 17*c*2, the new level of skill set assessment completed 186', the new expiration time and date 190' for the type of skill set assessment completed 188 and the new level of skill set assessment completed 186', the unique identifier 192 for the user 192 who completed the new skill set assessment and the identifier 194 for the network device 12, 14, 16, 20, 22, 24, 26, 31, 98-104.

At Step 160, sending securely from server digital indicator processing application 30*a* on the server network device 20, 22, 24, 26 the second selected digital indicator 17*c*2 to the network device 12, 14, 16, 20, 22, 24, 26, 31, 33, 98-104 via the communications network 18, 18' for display on the network device 12, 14, 16, 20, 22, 24, 26, 31, 33, 98-104, the selected second digital indicator 17*c*2 indicating completion of the type of skill set assessment completed 186 and the new level of skill set assessment completed 188' by the user 19.

In one embodiment, the second selected digital indicator 17*c*2 is sent securely using any of the security and/or encryption methods described herein. However, the present invention is not limited to such an embodiment and other security and/or encryption methods can be used to practice the invention.

In one embodiment, the selected digital indicator 17 with the selected second digital indicator 17*c*2 includes secure electronic link to a second file (e.g., graphical, text, audio, visual, haptic, etc.) including the digital indicator 17 with the selected second digital indicator 17*c*2. However, the present invention is not limited to such an embodiment and other embodiments can be used to practice the invention.

In one embodiment, the second file also includes security features (e.g., an SSL certificate, hash code, message digest code, encrypted user identifier, the created digital security identifier 17*a*, etc.) to prevent tampering and includes an expiration time and date.

For example, if a doctor has a completed a skill set assessment for a medical specialty and is required to complete such a skill set assessment each year to remain board certified, then the time and date would include a time and date the skill set assessment expires, etc. However, the present invention is not limited to such embodiments and other embodiments can be used to practice the invention.

Figure 9A:
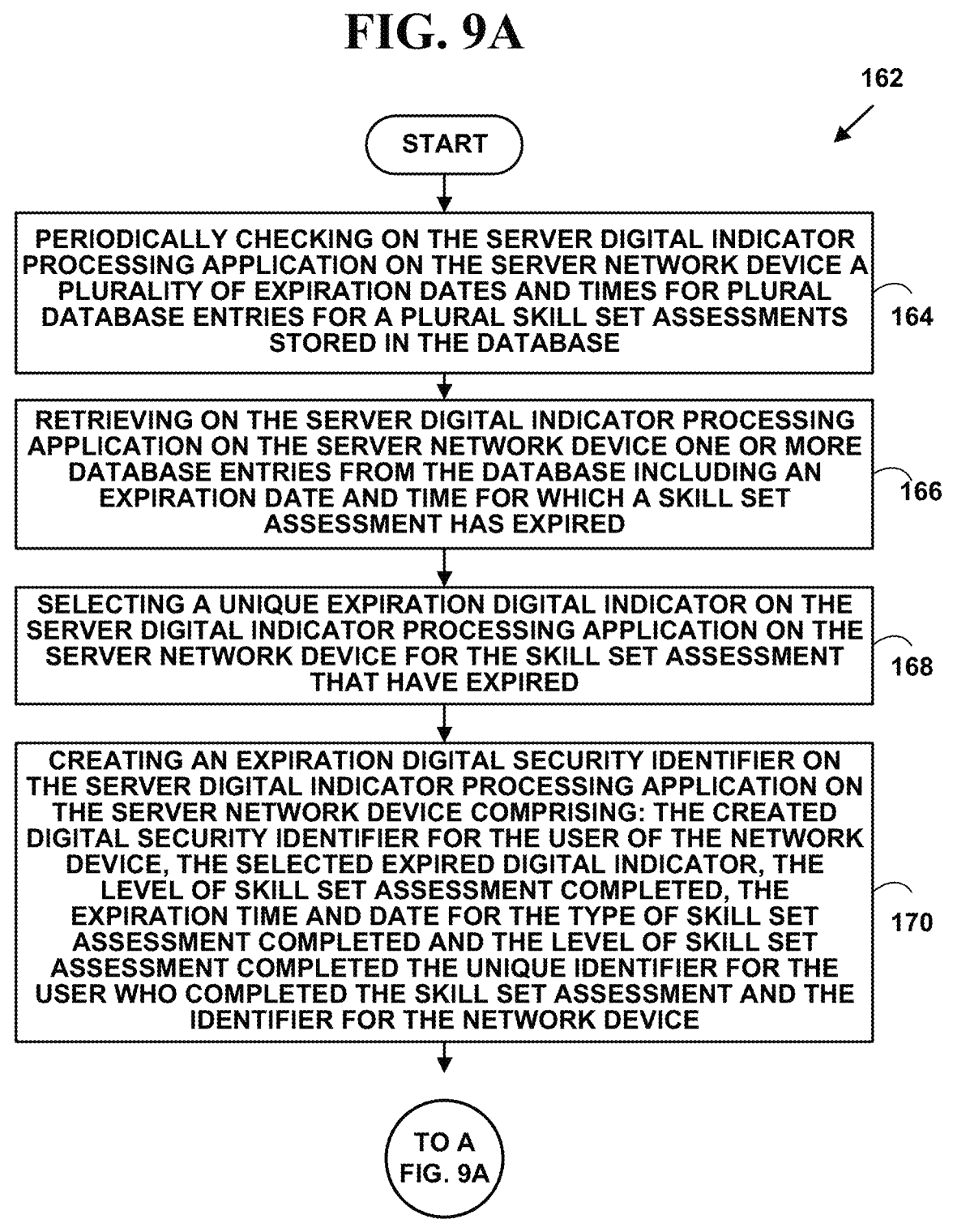

FIGS. 9A and 9B are a flow diagram illustrating a Method 162 for dynamic for dynamic digital indicator processing for skill set assessment systems.

In such an exemplary embodiment in FIG. 9A at Step 164, periodically checking on the server digital indicator processing application on the server network device plural expiration dates and times for plural of database entries for plural skill set assessments stored in the database; At Step 166, retrieving on the server digital indicator processing application on the server network device one or more database entries from the database including an expiration date and time for which a skill set assessment has expired; at Step 168, selecting a unique expiration digital indicator on the server digital indicator processing application on the server network device for the skill set assessment that have expired; at Step 170, creating an expiration digital security identifier on the server digital indicator processing application on the server network device comprising: the created digital security identifier for the user of the network device, the selected expired digital indicator, the level of skill set assessment completed, the expiration time and date for the type of skill set assessment completed and the level of skill set assessment completed the unique identifier for the user who completed the skill set assessment and the identifier for the network device; in FIG. 9B at Step 172, updating from the server digital indicator processing application on the server network device, the one or more retrieved database entries including: the created expiration digital security identifier, the created digital security identifier for the user of the network device, the selected expiration digital indicator, the level of skill set assessment completed, the expiration time and date for the type of skill set assessment completed and the level of skill set assessment completed, the unique identifier for the user who completed the skill set assessment and the identifier for the network device; and at Step 174, sending securely from server digital indicator processing application on the server network device the created expiration digital security identifier with the selected expiration digital indicator to the network device via the communications network for display on the network device, the selected expiration digital indicator indicating the level of skill set assessment completed has expired, and the created expiration digital security identifier preventing tampering of the created expiration digital security identifier with the selected expiration digital indicator indicating the level of skill set assessment completed has expired.

Method 162 is illustrated with an exemplary embodiment. However, the present invention is not limited to this exemplary embodiment and other embodiments can be used to practice the invention.

In such an exemplary embodiment in FIG. 9A at Step 164, periodically checking on the server digital indicator processing application 30*a* on the server network device 20, 22, 24, 26 plural expiration dates and times 190 for plural database entries for plural skill set assessments stored in the database 20', 22', 24' 26'.

At Step 166, retrieving on the server digital indicator processing application 30*a* on the server network device 20, 22, 24, 26 one or more database entries from the database 20', 22', 24' 26' including an expiration date and time 190 for which a skill set assessment class has expired.

At Step 168, selecting a unique expiration digital indicator 17*c*3 on the server digital indicator processing application 30*a* on the server network device 20, 22, 24, 26 for the skill set assessment that have expired 190.

In one embodiment, the unique expiration digital indicator 17*c*3 includes an expiration color includes a red color (e.g., to indicate STOP). However, the present invention is not limited to such an embodiment and other unique expiration digital indicator 17*c*3 and unique expiration colors may be used to practice the invention.

At Step 170, creating an expiration digital security identifier 17*t* on the server digital indicator processing application 30*a* on the server network device 20, 22, 24, 26 comprising: the created digital security identifier 17*a* for the user 19 of the network device 12, 14, 16, 20, 22, 24, 26, 31, 98-104, the selected expired digital indicator 17*ce*, the level of skill set assessment completed 188, the expiration time and date 190 for the type of skill set assessment completed 186 and the level of skill set assessment completed 188 the unique identifier 192 for the user 19 who completed the skill set assessment and the identifier 194 for the network device 12, 14, 16, 20, 22, 24, 26, 31, 98-104.

In FIG. 9B at Step 172, updating from the server digital indicator processing application 30*a* on the server network device 20, 22, 24, 26, the one or more retrieved database entries including: the created expiration digital security identifier 17*t*, the created digital security identifier 17*a* for the user 19 of the network device 12, 14, 16, 20, 22, 24, 26, 31, 98-104, the selected expiration digital indicator 17*ce*, the level of skill set assessment completed 188, the expiration time and date 190 for the type of skill set assessment completed 186 and the level of skill set assessment completed 188, the unique identifier 192 for the user 19 who completed the skill set assessment and the identifier 194 for the network device 12, 14, 16, 20, 22, 24, 26, 31, 98-104.

At Step 174, sending securely from server digital indicator processing application 30*a* on the server network device 20, 22, 24, 26 the created expiration digital security identifier 17*t* with the selected expiration digital indicator 17*ce* to the network device 12, 14, 16, 20, 22, 24, 26, 31, 33, 98-104 via the communications network 18, 18' for display on the network device 12, 14, 16, 20, 22, 24, 26, 31, 33, 98-104, the selected expiration digital indicator 17*ce* indicating the level of skill set assessment completed 188 has expired, and the created expiration digital security identifier 17*t* preventing tampering of the created expiration digital security identifier 17*t* with the selected expiration digital indicator 17*c*3 indicating the level of skill set assessment completed 188 has expired.

For example, if a doctor has a completed a skill set assessment for a medical specialty and is required to complete such a skill set assessment each year to remain board certified, then the time and date would include a time and date the skill set assessment expires, etc. However, the present invention is not limited to such embodiments and other embodiments can be used to practice the invention.

The methods and system described herein is also used are also used to determine a status for professional licenses (e.g., medical, dental, law, accounting, insurance, etc.).

FIG. 10 is a block diagram 176 illustrating a dataflow 178', 178" for dynamic for dynamic digital indicator processing for skill set assessment systems.

FIG. 10 illustrates changing a color only for a digital indicator 17. However, the present invention is not limed to such an embodiment and other embodiments can be used to practice the invention.

Methods 130 (FIG. 7) and 150 (FIG. 8) are executed plural times to change a color of a digital indicator 17 from a first color 17*c*1, to (168) a second color, 17*c*2 to (168') a third color 17*c*3, for a type of skill set assessment class 186 that includes three levels 188, etc. Only three levels and three colors are illustrated for simplicity and the invention is not limited to three levels and three colors and more, and/or other colors and levels can be used to practice the invention.

FIG. 10 also illustrates three digital security identifiers 17*a*, 17*a'*, 17*a"* corresponding to the three colors 17*c*1, 17*c*2 and 17*c*3.

FIG. 11 is a block diagram 178 illustrating a dataflow 180 for dynamic digital indicator processing for skill set assessment systems.

FIG. 11 illustrates changing a color only for a digital indicator 17. However, the present invention is not limed to such an embodiment and other embodiments can be used to practice the invention.

In FIG. 11, Method 162 (FIG. 9) is executed to change a color of a digital indicator 17 from a first active color 17*c*1, a second active color 17*c*2 (181) and/or a third active color 17*c*3 directly to (181') an expiration color, 17*ce*. Only three levels and three colors are illustrated for simplicity and the invention is not limited to three levels and three colors and more, and/or other colors and levels can be used to practice the invention.

Figure 13:
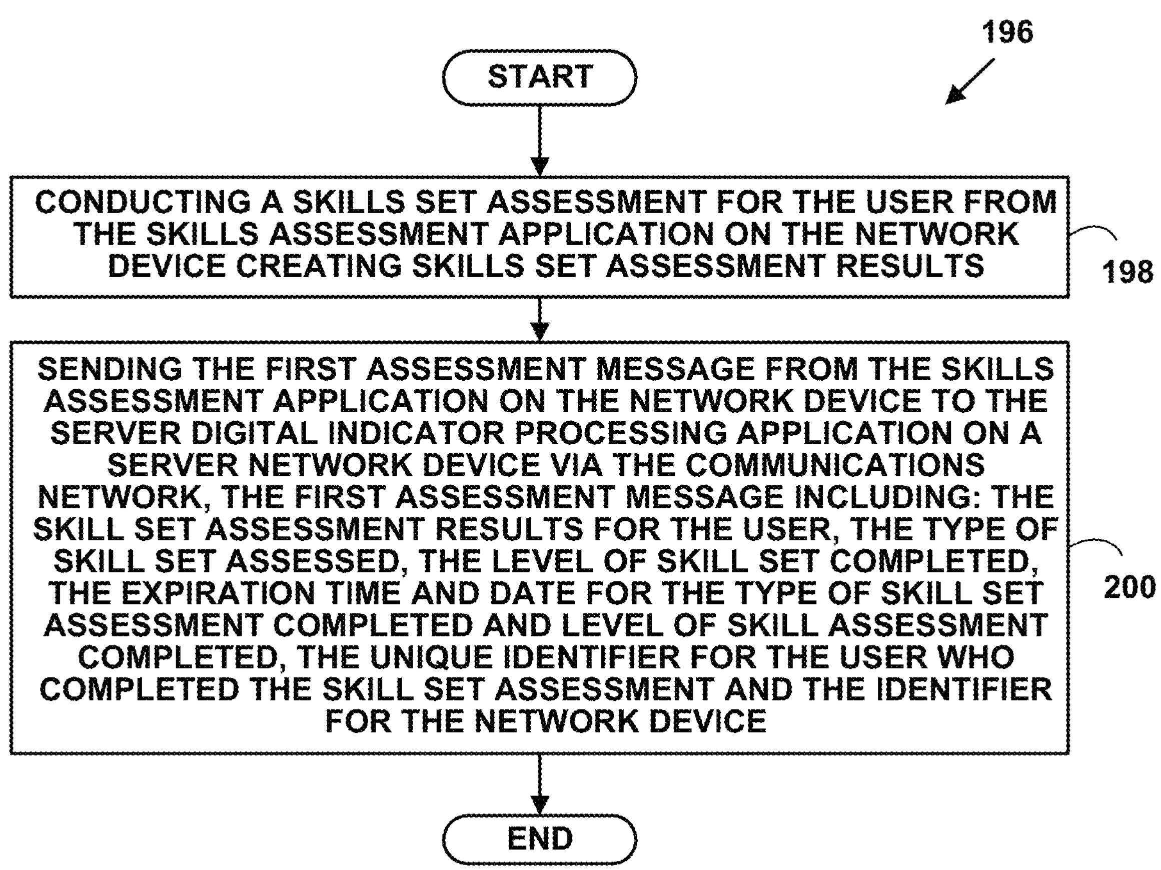
FIG. 13 is a flow diagram illustrating a method for dynamic digital indicator processing for skill set assessment systems.

FIG. 13 is a flow diagram illustrating a Method 196 for dynamic digital indicator processing for skill set assessment systems.

In FIG. 13 at Step 198, conducting a skills set assessment for the user from the skills assessment application on the network device creating skills set assessment results for the user; and at Step 200, sending the first assessment message from the skills assessment application on the network device to the server digital indicator processing application on a server network device via the communications network, the first assessment message including: the desire skills set assessment results, the type of skill set assessed, the level of skill set completed, the expiration time and date for the type of skill set assessment completed and level of skill assessment completed, the unique identifier for the user who completed the skill set assessment and the identifier for the network device.

Method 198 is illustrated with an exemplary embodiment. However, the present invention is not limited to this exemplary embodiment and other embodiments can be used to practice the invention.

In such an exemplary embodiment in FIG. 13 at Step 198, conducting a skills set assessment for the user 19 from the skills assessment application 30 on the network device 12, 14, 16, 20, 22, 24, 26, 31, 33, 98-104 creating skills set assessment results 185 (FIG. 12) for the user 19.

In one embodiment, the skills assessment application 30 on the network device 12, 14, 16, 20, 22, 24, 26, 31, 33, 98-104 includes skills set assessments with one or more methods to dynamically measure, improve and convey skill levels of users 19 including the measurement, improvement and conveying of micro-skills over time. The one or more methods further include methods to test and evaluate a desired skill set (e.g., tech, legal, medical, accounting, etc.) of a user and provides a feedback loop to accurately evaluate and guide knowledge skills updates and learning of new skills The one or more methods further include learning-based models that evaluate a user 19 taking into account the learning environment of the use including loss of skills due to forgetting over time, forgetting due to distractions in the learning environment (e.g., noise, texting, social media, etc.), advancing age, etc. However, the present invention is not limited to such embodiments and other evaluation methods and other embodiments can be used to practice the invention.

At Step 200, sending the first assessment message 13*a*/15*a* from the skills assessment application 30 30 on the network device to the server digital indicator processing application on a server network device 12, 14, 16, 20, 22, 24, 26, 31, 33, 98-104 via the communications network 18, 18', the first assessment message 13*a*/15*a* including: the skills set assessment results 185 for the user 19, the type of skill set assessed 186, the level of skill set completed 188, the expiration time and date 190 for the type of skill set assessment completed 186 and level of skill assessment completed 188, the unique identifier 192 for the user 19 who completed the skill set assessment and the identifier 194 for the network device 12, 14, 16, 20, 22, 24, 26, 31, 33, 98-104.

Figure 14:
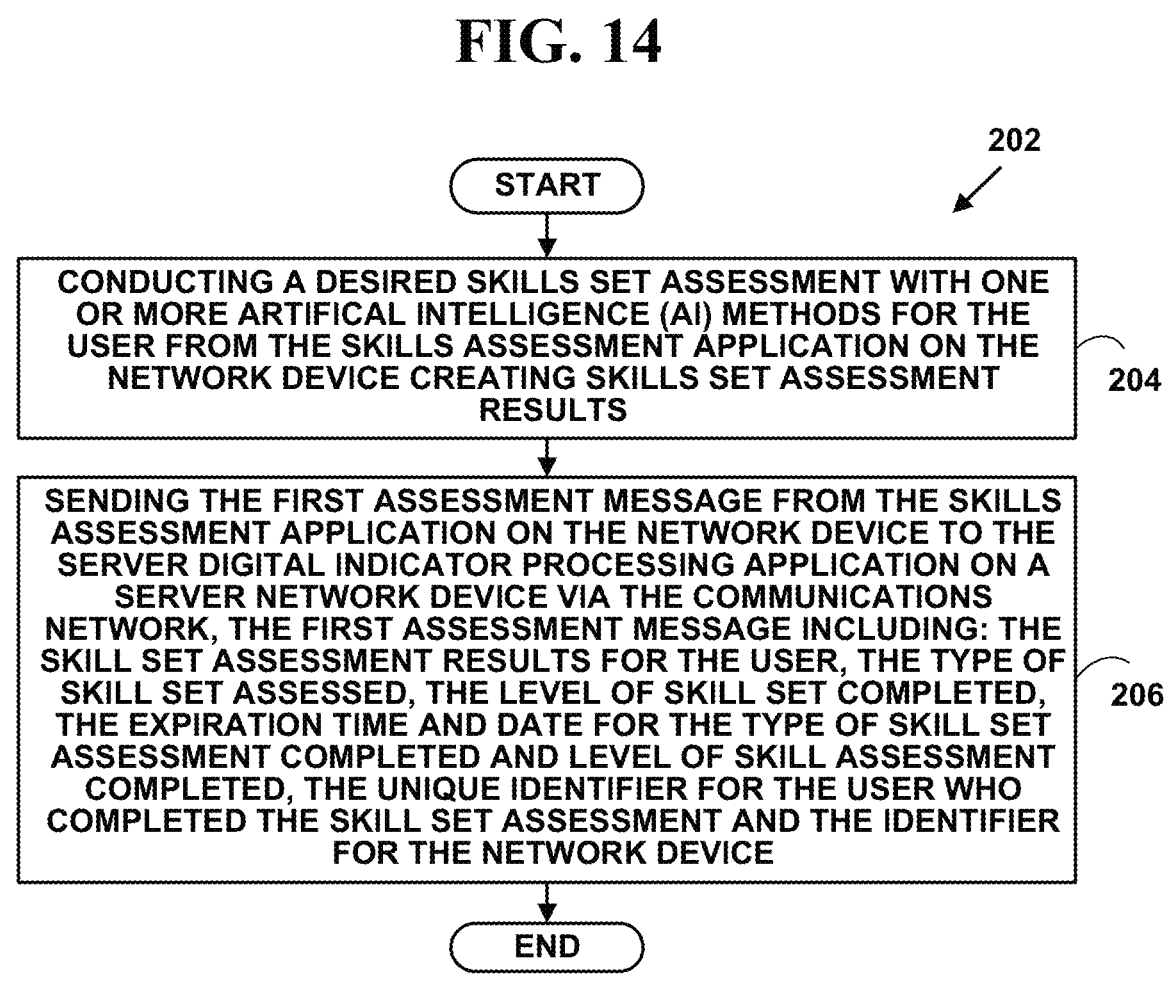

FIG. 14 is a flow diagram illustrating a Method 202 for dynamic digital indicator processing for skill set assessment systems.

In FIG. 14 at Step 204, conducting a skills set assessment with one or more Artificial Intelligence (AI) methods for the user from the skills assessment application on the network device creating skills set assessment results for the user; and at Step 206, sending the first assessment message from the skills assessment application on the network device to the server digital indicator processing application on a server network device via the communications network, the first assessment message including: the desire skills set assessment results, the type of skill set assessed, the level of skill set completed, the expiration time and date for the type of skill set assessment completed and level of skill assessment completed, the unique identifier for the user who completed the skill set assessment and the identifier for the network device.

Method 202 is illustrated with an exemplary embodiment. However, the present invention is not limited to this exemplary embodiment and other embodiments can be used to practice the invention.

In such an exemplary embodiment in FIG. 14 at Step 204, conducting a skills set assessment with one or more Artificial Intelligence (AI) methods for the user 19 from the skills assessment application 30 on the network device 12, 14, 16, 20, 22, 24, 26, 31, 33, 98-104 creating skills set assessment results 185 (FIG. 12) for the user 19.

In one embodiment, the skills assessment application 30 on the network device 12, 14, 16, 20, 22, 24, 26, 31, 33, 98-104 includes one or more Artificial Intelligence (AI) methods for skills set assessments to dynamically measure, improve and convey skill levels of users 19 including the measurement, improvement and conveying of micro-skills over time. The one or more AI methods further include methods to test and evaluate a desired skill set (e.g., tech, legal, medical, accounting, etc.) of a user and provides a feedback loop to accurately evaluate and guide knowledge skills updates and learning of new skills The one or more AI methods further include learning-based models that evaluate a user 19 taking into account the learning environment of the use including loss of skills due to forgetting over time, forgetting due to distractions in the learning environment (e.g., noise, texting, social media, etc.), advancing age, etc. However, the present invention is not limited to such embodiments and other evaluation methods and other embodiments can be used to practice the invention.

At Step 206, sending the first assessment message 13*a*/15*a* from the skills assessment application 30 on the network device to the server digital indicator processing application on a server network device 12, 14, 16, 20, 22, 24, 26, 31, 33, 98-104 via the communications network 18, 18', the first assessment message 13*a*/15*a* including: the skills set assessment results 185 for the user 19, the type of skill set assessed 186, the level of skill set completed 188, the expiration time and date 190 for the type of skill set assessment completed 186 and level of skill assessment completed 188, the unique identifier 192 for the user 19 who completed the skill set assessment and the identifier 194 for the network device 12, 14, 16, 20, 22, 24, 26, 31, 33, 98-104.

A method and system for dynamic skills assessment is presented herein. Digital indicators are used with dynamic skill assessment indicators to indicate plurals type of skill sets assessed, plural levels of skill sets completed, plural expiration times and dates for the plurals type of skill set assessment completed and plurals levels of skill assessment completed, plural unique identifiers for plural users who completed the plural skill set assessments and plural identifiers for plural network devices on which the plurals skill sets were assessed for the plural users. The dynamic skill assessment indicators include plural different indicators including graphical, audio, video, text and/or haptic dynamic skill assessment indicators that dynamically are changed to different colors, shapes, sizes, sounds, feelings, etc., when new skill sets are achieved and when skill sets expire.

It should be understood that the architecture, programs, processes, methods and systems described herein are not related or limited to any particular type of computer or network system (hardware or software), unless indicated otherwise. Various types of computer systems may be used with or perform operations in accordance with the teachings described here3in.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. § 112, paragraph 6, and any claim without the word "means" is not so intended. Therefore, all embodiments that come within the scope and spirit of the following claims and equivalents thereto are claimed as the invention.

Therefore, all embodiments that come within the scope and spirit of the proceeding described embodiments and equivalents thereto are identified are claimed as the invention.

We claim:

1. A method for dynamic digital indicator processing for skill set assessment systems, comprising:

receiving a first assessment message on a server digital indicator processing application on a server network device with one or more processors from a skills assessment application on a network device with one or more processors via a communications network, the first assessment message including: skills set assessment results, a type of skill set assessed, a level of skill set completed, an expiration time and date for the type of skill set assessment completed and level of skill assessment completed, a unique identifier for a user who completed the skill set assessment and an identifier for the network device;

selecting a digital indicator on the server digital indicator processing application on the server network device based on the type of type of skill set assessment completed included in the first assessment message;

selecting a first skill assessment indicator on the server digital indicator processing application on the server network device for the digital indicator indicating the level of skill assessment completed included in the first assessment message;

creating a digital security identifier on the server digital indicator processing application on the server network device with an Artificial Intelligence (AI) method on an AI application on the server digital indicator processing application on the server network device to circumvent hacking of the digital security identifier, the AI method including a collection of known hacking and spoofing techniques used by hackers that is periodically and continuously updated by the AI application, the AI method including machine intelligence with intelligent agents comprising software applications or hardware devices that perceive environments and takes actions that maximize the chance of successfully achieving the AI method goal of circumvent hacking of the digital security identifier;

the digital security identifier including the selected digital indicator, the selected first skill assessment indicator, the type of skill set assessment indicator completed, the level of skill set assessment class completed, the expiration time and date for the type of skill set assessment completed and level of skill set assessment completed, the unique identifier for the user who completed the skill set assessment and the identifier for the network device;

adding to the created digital security identifier on the server digital indicator processing application on the server network device, a digital signature, hash code, message digest code, an encrypted Secure Sockets Layer (SSL) certificate and an encrypted user identifier comprising: the selected digital indicator, a selected first color identifier for the type of skill set assessment and the level of skill set completed;

creating a secure electronic link including a Uniform Resource Locator (URL) with the AI method on the AI application on the server digital indicator processing application on the server network device to circumvent hacking of the electronic link;

providing from the server digital indicator processing application on the server network device via the communications network in real-time, time-of-click verification of the created secure electronic link providing anti-spam and anti-malware protection for the created secure electronic link, when activated by the skills assessment application on the network device;

creating from the server digital indicator processing application on the server network device a database entry in a database, the database entry for storing in the database the created digital security identifier including: the selected digital indicator, the selected first skill set assessment indicator, the skills set assessment results, the type of skill set assessment completed, the level of skill set assessment completed, the expiration time and date for the type of skill set assessment completed and the level skill set assessment completed, the unique identifier for the user who completed the skill set assessment and the identifier for the network device;

sending the created a secure electronic link from the server digital indicator processing application on the server network device to the skills assessment application on the network device via the communications network including the created digital security identifier to access and display the selected digital indicator with the selected first skill assessment indicator on the network device;

receiving a link selection message from the created secure electronic link on server digital indicator processing application on the server network device from the skills assessment application on the network device via the communications network, the link selection message including the created digital security identifier;

conducting a database query on the server digital indicator processing application on the server network device with the created digital security identifier received in the link selection message to obtain the database entry including the created digital security identifier;

sending securely from server digital indicator processing application on the server network device the selected digital indicator with the selected first skill assessment indicator to the skills assessment application on the network device via the communications network in a response message for display on the network device, the selected digital indicator with the selected first skill assessment indicator indicating the type of skill set assessment completed and the level of skill set assessment completed by the user;

displaying the selected digital indicator with the selected first skill assessment indicator included in the response message on a graphical user interface (GUI) on the skills assessment application on the network device; and dynamically changing from the server digital indicator processing application on the server network device via the communications network a display type, color, shape, size, sound, video, text, or haptic event of the selected digital indicator on the GUI on the skills assessment application on network device without input from the skills assessment application on the network device.

2. The method of claim 1, wherein the skills assessment application on the network device includes one or more methods to: (1) dynamically measure, improve and convey skill levels the user including the measurement, improvement and conveying of micro-skills over time; (2) test and evaluate a desired skill set of the user providing a feedback loop to accurately evaluate and guide knowledge skills updates and learning of new skills by the user; and (3) learning-based models that evaluate the user taking into account the learning environment of the use including loss of skills due to forgetting over time, forgetting due to distractions in the learning environment due to noise, texting, social media or advancing age.

3. The method of claim 1, wherein the unique identifier for the user includes a user name, telephone number, email identifier, social media identifier or a combination thereof.

4. The method of claim 1, wherein the identifier for the network device, includes, but is not limited to, a domain name, network address, telephone number, MAC number, serial number, International Mobile Equipment Identity (IMEI), Mobile Identification Number (MIN), Integrated Circuit Card Identifier (ICCID) associated with a Subscriber Identity Module (SIM) card, SIM card identifier, or a combination thereof.

5. The method of claim 1, wherein the skill set assessment includes: professional skill set assessment, for medical professionals, lawyers, accountants, insurance professionals, technology professionals, police, fire, paramedic, emergency medical technicians (EMTs), academic skill set assessment, martial arts skill set assessment, music skill set assessment and other skill sets where proficiency and skills are developed over time.

6. The method of claim 1, wherein the first skill assessment indicator includes a graphical, text, audio, video or haptic, first skill assessment indicator.

7. The method of claim 1, wherein the digital security identifier includes a hash code, a message digest code, an encrypted Secure Sockets Layer (SSL) certificate, or an encrypted user identifier comprising: the selected digital indicator, the selected first skill assessment indicator, the type of skill set assessment class completed, the level of skill set assessment class completed, the unique identifier for the user who completed the skill set assessment class and the identifier for the network device.

8. The method of claim 1, wherein the database entry includes one or more cloud storage objects stored in one more cloud databases or a blockchain entry in a blockchain.

9. The method of claim 1, further comprising:

adding from server digital indicator processing application on the server network device to the created secure electronic link a time and date when the type of skill set assessment completed by the and the level of skill set assessment class completed by the user expires.

10. The method of claim 1, wherein the created secure electronic link further includes another secure electronic link to an electronic data tree in which a plurality of different skill set assessment identifiers are stored for the user.

11. The method of claim 1, wherein server network device and the network device include one or more wireless communications interfaces comprising: cellular telephone, 802.11a, 802.11b, 802.11 g, 802.11n, 802.15.4 (ZigBee), Wireless Fidelity (Wi-Fi), Wi-Fi Aware, Worldwide Interoperability for Microwave Access (WiMAX), ETSI High Performance Radio Metropolitan Area Network (HIPERMAN), Near Field Communications (NFC), Machine-to-Machine (M2M), 802.15.1 (BLUETOOTH), infra data association (IrDA), wireless communications interfaces.

12. The method of claim 1 wherein the network device includes one or more of: cell phones, laptop computers, tablet computers, smart phones, personal digital/data assistants (PDA), portable game consoles, wearable network devices, or Internet of Things (IoT), network devices.

13. The method of claim 1, wherein the communications network further includes:

a cloud communications network, one or more cloud server network devices, one or more cloud databases;

one or more cloud storage objects in the one or more cloud databases; and a cloud computing Infrastructure as a Service (IaaS), including a cloud software infrastructure service, a cloud platform as a Service (PaaS) including a cloud software platform service and one or more cloud Software as a Services (SaaS), including a specific SaaS, for dynamic digital indicator processing services for skill set assessment systems, wherein the one or more cloud storage objects include Representational state transfer (REST), Simple Object Access Protocol (SOAP), Lightweight Directory Access Protocol (LDAP) or Application Programming Interface (API) objects.

14. The method of claim 1, wherein the selected digital indicator with the selected first skill assessment indicator includes a file specifically for the type of skill set assessment completed and the level of skill set assessment completed with the expiration time and date and one or more security features comprising one or more of: a hash code, message digest code, encrypted Secure Sockets Layer (SSL) certificate, encrypted user identifier, or the created digital security identifier, to prevent tampering.

15. The method of claim 1, further including: creating the digital security identifier and the secure electronic link using an Artificial Intelligence (AI) application and one or more selected AI methods on the server digital indicator processing application the server network device to: (1) dynamically measure, improve and convey skill levels the user including the measurement, improvement and conveying of micro-skills over time; (2) test and evaluate a desired skill set of the user providing a feedback loop to accurately evaluate and guide knowledge skills updates and learning of new skills by the user; and (3) learning-based models that evaluate the user taking into account the learning environment of the use including loss of skills due to forgetting over time, forgetting due to distractions in the learning environment due to noise, texting, social media or advancing age; and (4) a collection of known hacking and spoofing techniques and methods used by hackers to circumvent hacking.

16. The method of claim 1, wherein the first completion message includes: an e-mail, Short Message Service (SMS), Multimedia Message Service (MMS), Rich Communication Suite (RCS), Direct Message (DM), Instant Message (IM), social media, network protocol or telephony, first completion message.

17. The method of claim 1, wherein the type of skill set assessment completed and level of skill set assessment completed further include: a type of skill set assessment for a professional license and a level of skill set assessment completed for a professional license.

18. The method of claim 1 further comprising:

receiving a second assessment message on the server digital indicator processing application on the server network device from the skills assessment application on the network device via the communications network, the second assessment message including the created digital security identifier, a new level of skill set assessment completed and a new skill set assessment results for the user conducting a second database query on the server digital indicator processing application on the server network device with the created digital security identifier from the second completion message to obtain the database entry including the created digital security identifier from the received second assessment message;

selecting a second digital indicator different from the first selected digital indicator on the server digital indicator processing application on the server network device for the digital indicator indicating the new level of skill set assessment completed included in the second completion message;

updating from the server digital indicator processing application on the server network device the database entry in the database for digital security identifier, the database entry including: new skill set assessment results, the selected digital indicator, the new selected second digital indicator, the new level of skill set assessment completed, the new expiration time and date for the type of skill set assessment completed and the level of skill set assessment completed, the unique identifier for the user who completed the skill set assessment and the identifier for the network device; and sending securely from server digital indicator processing application on the server network device the second selected digital indicator to the network device via the communications network for display on the network device, the selected second digital indicator indicating completion of the type of skill set assessment and the new level of skill set assessment completed by the user.

19. The Method of claim 1, further comprising:

periodically checking on the server digital indicator processing application on the server network device a plurality of expiration dates and times for a plurality of database entries for a plurality of skill set assessments stored in the database;

retrieving on the server digital indicator processing application on the server network device one or more database entries from the database including an expiration date and time for which a skill set assessment has expired;

selecting a unique expiration digital indicator on the server digital indicator processing application on the server network device for the skill set assessment that have expired;

creating an expiration digital security identifier on the server digital indicator processing application on the server network device comprising: the created digital security identifier for the user of the network device, the selected expired digital indicator, the level of skill set assessment completed, the expiration time and date for the type of skill set assessment completed and the level of skill set assessment completed the unique identifier for the user who completed the skill set assessment and the identifier for the network device;

updating from the server digital indicator processing application on the server network device, the one or more retrieved database entries including: the created expiration digital security identifier, the created digital security identifier for the user of the network device, the selected expiration digital indicator, the level of skill set assessment completed, the expiration time and date for the type of skill set assessment completed and the level of skill set assessment completed, the unique identifier for the user who completed the skill set assessment and the identifier for the network device; and sending securely from server digital indicator processing application on the server network device the created expiration digital security identifier with the selected expiration digital indicator to the network device via the communications network for display on the network device, the selected expiration digital indicator indicating the level of skill set assessment completed has expired, and the created expiration digital security identifier preventing tampering of the created expiration digital security identifier with the selected expiration digital indicator indicating the level of skill set assessment completed has expired.

20. The method claim 1, further comprising:

conducting a desired skills set assessment for the user from the skills assessment application on the network device creating skills set assessment results; and sending the first assessment message from the skills assessment application on the network device to the server digital indicator processing application on a server network device via the communications network, the first assessment message including: the desire skills set assessment results, the type of skill set assessed, the level of skill set completed, the expiration time and date for the type of skill set assessment completed and level of skill assessment completed, the unique identifier for the user who completed the skill set assessment and the identifier for the network device.

21. A non-transitory computer readable having stored therein a plurality of instructions for causing one or more processors to execute the steps of:

receiving a first assessment message on a server digital indicator processing application on a server network device with one or more processors from a skills assessment application on a network device with one or more processors via a communications network, the first assessment message including: skills set assessment results, a type of skill set assessed, a level of skill set completed, an expiration time and date for the type of skill set assessment completed and level of skill assessment completed, a unique identifier for a user who completed the skill set assessment and an identifier for the network device;

selecting a digital indicator on the server digital indicator processing application on the server network device based on the type of type of skill set assessment completed included in the first assessment message;

selecting a first skill assessment indicator on the server digital indicator processing application on the server network device for the digital indicator indicating the level of skill assessment completed included in the first assessment message;

creating a digital security identifier on the server digital indicator processing application on the server network device with an Artificial Intelligence (AI) method on an AI application on the server digital indicator processing application on the server network device to circumvent hacking of the digital security identifier, the AI method including a collection of known hacking and spoofing techniques used by hackers that is periodically and continuously updated by the AI application, the AI method including machine intelligence with intelligent agents comprising software applications or hardware devices that perceive environments and takes actions that maximize the chance of successfully achieving the AI method goal of circumvent hacking of the digital security identifier;

the digital security identifier including the selected digital indicator, the selected first skill assessment indicator, the type of skill set assessment indicator completed, the level of skill set assessment class completed, the expiration time and date for the type of skill set assessment completed and level of skill set assessment completed, the unique identifier for the user who completed the skill set assessment and the identifier for the network device;

adding to the created digital security identifier on the server digital indicator processing application on the server network device, a digital signature, hash code, message digest code, an encrypted Secure Sockets Layer (SSL) certificate and an encrypted user identifier comprising: the selected digital indicator, a selected first color identifier for the type of skill set assessment and the level of skill set completed;

creating a secure electronic link including a Uniform Resource Locator (URL) with the AI method on the AI application on the server digital indicator processing application on the server network device to circumvent hacking of the electronic link;

providing from the server digital indicator processing application on the server network device via the communications network in real-time, time-of-click verification of the created secure electronic link providing anti-spam and anti-malware protection for the created secure electronic link, when activated by the skills assessment application on the network device;

creating from the server digital indicator processing application on the server network device a database entry in a database, the database entry for storing in the database the created digital security identifier including: the selected digital indicator, the selected first skill set assessment indicator, the skills set assessment results, the type of skill set assessment completed, the level of skill set assessment completed, the expiration time and date for the type of skill set assessment completed and the level skill set assessment completed, the unique identifier for the user who completed the skill set assessment and the identifier for the network device;

sending the created a secure electronic link from the server digital indicator processing application on the server network device to the skills assessment application on the network device via the communications network including the created digital security identifier to access and display the selected digital indicator with the selected first skill assessment indicator on the network device;

receiving a link selection message from the created secure electronic link on server digital indicator processing application on the server network device from the skills assessment application on the network device via the communications network, the link selection message including the created digital security identifier;

conducting a database query on the server digital indicator processing application on the server network device with the created digital security identifier received in the link selection message to obtain the database entry including the created digital security identifier;

sending securely from server digital indicator processing application on the server network device the selected digital indicator with the selected first skill assessment indicator to the skills assessment application on the network device via the communications network in a response message for display on the network device, the selected digital indicator with the selected first skill assessment indicator indicating the type of skill set assessment completed and the level of skill set assessment completed by the user;

displaying the selected digital indicator with the selected first skill assessment indicator included in the response message on a graphical user interface (GUI) on the skills assessment application on the network device;

dynamically changing from the server digital indicator processing application on the server network device via the communications network a display type, color, shape, size, sound, video, text, or haptic event of the selected digital indicator on the GUI on the skills assessment application on network device without input from the skills assessment application on the network device;

receiving a second assessment message on the server digital indicator processing application on the server network device from the skills assessment application on the network device via the communications network, the second assessment message including the created digital security identifier, a new level of skill set assessment completed and a new skill set assessment results for the user conducting a second database query on the server digital indicator processing application on the server network device with the created digital security identifier from the second completion message to obtain the database entry including the created digital security identifier from the received second assessment message;

selecting a second digital indicator different from the first selected digital indicator on the server digital indicator processing application on the server network device for the digital indicator indicating the new level of skill set assessment completed included in the second completion message;

updating from the server digital indicator processing application on the server network device the database entry in the database for digital security identifier, the database entry including: new skill set assessment results, the selected digital indicator, the new selected second digital indicator, the new level of skill set assessment completed, the new expiration time and date for the type of skill set assessment completed and the level of skill set assessment completed, the unique identifier for the user who completed the skill set assessment and the identifier for the network device;

sending securely from server digital indicator processing application on the server network device the second selected digital indicator to the network device via the communications network for display on the network device, the selected second digital indicator indicating completion of the type of skill set assessment and the new level of skill set assessment completed by the user;

periodically checking on the server digital indicator processing application on the server network device a plurality of expiration dates and times for a plurality of database entries for a plurality of skill set assessments stored in the database;

retrieving on the server digital indicator processing application on the server network device one or more database entries from the database including an expiration date and time for which a skill set assessment has expired;

selecting a unique expiration digital indicator on the server digital indicator processing application on the server network device for the skill set assessment that have expired;

creating an expiration digital security identifier on the server digital indicator processing application on the server network device comprising: the created digital security identifier for the user of the network device, the selected expired digital indicator, the level of skill set assessment completed, the expiration time and date for the type of skill set assessment completed and the level of skill set assessment completed the unique identifier for the user who completed the skill set assessment and the identifier for the network device;

updating from the server digital indicator processing application on the server network device, the one or more retrieved database entries including: the created expiration digital security identifier, the created digital security identifier for the user of the network device, the selected expiration digital indicator, the level of skill set assessment completed, the expiration time and date for the type of skill set assessment completed and the level of skill set assessment completed, the unique identifier for the user who completed the skill set assessment and the identifier for the network device; and sending securely from server digital indicator processing application on the server network device the created expiration digital security identifier with the selected expiration digital indicator to the network device via the communications network for display on the network device, the selected expiration digital indicator indicating the level of skill set assessment completed has expired, and the created expiration digital security identifier preventing tampering of the created expiration digital security identifier with the selected expiration digital indicator indicating the level of skill set assessment completed has expired.

22. A system for dynamic digital indicator processing for skill set assessment systems, comprising, in combination:

one or more network devices each with one or more processors;

one or more server network devices each with one or more processors;

one or more databases;

a communications network;

the one or more processors on the one or more network devices and the one or more server network devices including a plurality of instructions:

for receiving a first assessment message on a server digital indicator processing application on a server network device with one or more processors from a skills assessment application on a network device with one or more processors via a communications network, the first assessment message including: skills set assessment results, a type of skill set assessed, a level of skill set completed, an expiration time and date for the type of skill set assessment completed and level of skill assessment completed, a unique identifier for a user who completed the skill set assessment and an identifier for the network device;

for selecting a digital indicator on the server digital indicator processing application on the server network device based on the type of type of skill set assessment completed included in the first assessment message;

for selecting a first skill assessment indicator on the server digital indicator processing application on the server network device for the digital indicator indicating the level of skill assessment completed included in the first assessment message;

for creating a digital security identifier on the server digital indicator processing application on the server network device with an Artificial Intelligence (AI) method on an AI application on the server digital indicator processing application on the server network device to circumvent hacking of the digital security identifier, the AI method including a collection of known hacking and spoofing techniques used by hackers that is periodically and continuously updated by the AI application, the AI method including machine intelligence with intelligent agents comprising software applications or hardware devices that perceive environments and takes actions that maximize the chance of successfully achieving the AI method goal of circumvent hacking of the digital security identifier;

the digital security identifier including the selected digital indicator, the selected first skill assessment indicator, the type of skill set assessment indicator completed, the level of skill set assessment class completed, the expiration time and date for the type of skill set assessment completed and level of skill set assessment completed, the unique identifier for the user who completed the skill set assessment and the identifier for the network device;

for adding to the created digital security identifier on the server digital indicator processing application on the server network device, a digital signature, hash code, message digest code, an encrypted Secure Sockets Layer (SSL) certificate and an encrypted user identifier comprising: the selected digital indicator, a selected first color identifier for the type of skill set assessment and the level of skill set completed;

for creating a secure electronic link including a Uniform Resource Locator (URL) with the AI method on the AI application on the server digital indicator processing application on the server network device to circumvent hacking of the electronic link;

for providing from the server digital indicator processing application on the server network device via the communications network in real-time, time-of-click verification of the created secure electronic link providing anti-spam and anti-malware protection for the created secure electronic link, when activated by the skills assessment application on the network device;

for creating from the server digital indicator processing application on the server network device a database entry in a database, the database entry for storing in the database the created digital security identifier including: the selected digital indicator, the selected first skill set assessment indicator, the skills set assessment results, the type of skill set assessment completed, the level of skill set assessment completed, the expiration time and date for the type of skill set assessment completed and the level skill set assessment completed, the unique identifier for the user who completed the skill set assessment and the identifier for the network device;

for sending the created a secure electronic link from the server digital indicator processing application on the server network device to the skills assessment application on the network device via the communications network including the created digital security identifier to access and display the selected digital indicator with the selected first skill assessment indicator on the network device;

for receiving a link selection message from the created secure electronic link on server digital indicator processing application on the server network device from the skills assessment application on the network device via the communications network, the link selection message including the created digital security identifier;

for conducting a database query on the server digital indicator processing application on the server network device with the created digital security identifier received in the link selection message to obtain the database entry including the created digital security identifier;

for sending securely from server digital indicator processing application on the server network device the selected digital indicator with the selected first skill assessment indicator to the skills assessment application on the network device via the communications network in a response message for display on the network device, the selected digital indicator with the selected first skill assessment indicator indicating the type of skill set assessment completed and the level of skill set assessment completed by the user;

for displaying the selected digital indicator with the selected first skill assessment indicator included in the response message on a graphical user interface (GUI) on the skills assessment application on the network device;

for dynamically changing from the server digital indicator processing application on the server network device via the communications network a display type, color, shape, size, sound, video, text, or haptic event of the selected digital indicator on the GUI on the skills assessment application on network device without input from the skills assessment application on the network device;

for receiving a second assessment message on the server digital indicator processing application on the server network device from the skills assessment application on the network device via the communications network, the second assessment message including the created digital security identifier, a new level of skill set assessment completed and a new skill set assessment results for the user for conducting a second database query on the server digital indicator processing application on the server network device with the created digital security identifier from the second completion message to obtain the database entry including the created digital security identifier from the received second assessment message;

for selecting a second digital indicator different from the first selected digital indicator on the server digital indicator processing application on the server network device for the digital indicator indicating the new level of skill set assessment completed included in the second completion message;

for updating from the server digital indicator processing application on the server network device the database entry in the database for digital security identifier, the database entry including: new skill set assessment results, the selected digital indicator, the new selected second digital indicator, the new level of skill set assessment completed, the new expiration time and date for the type of skill set assessment completed and the level of skill set assessment completed, the unique identifier for the user who completed the skill set assessment and the identifier for the network device;

for sending securely from server digital indicator processing application on the server network device the second selected digital indicator to the network device via the communications network for display on the network device, the selected second digital indicator indicating completion of the type of skill set assessment and the new level of skill set assessment completed by the user;

periodically checking on the server digital indicator processing application on the server network device a plurality of expiration dates and times for a plurality of database entries for a plurality of skill set assessments stored in the database;

for retrieving on the server digital indicator processing application on the server network device one or more database entries from the database including an expiration date and time for which a skill set assessment has expired;

for selecting a unique expiration digital indicator on the server digital indicator processing application on the server network device for the skill set assessment that have expired;

for creating an expiration digital security identifier on the server digital indicator processing application on the server network device comprising: the created digital security identifier for the user of the network device, the selected expired digital indicator, the level of skill set assessment completed, the expiration time and date for the type of skill set assessment completed and the level of skill set assessment completed the unique identifier for the user who completed the skill set assessment and the identifier for the network device;

for updating from the server digital indicator processing application on the server network device, the one or more retrieved database entries including: the created expiration digital security identifier, the created digital security identifier for the user of the network device, the selected expiration digital indicator, the level of skill set assessment completed, the expiration time and date for the type of skill set assessment completed and the level of skill set assessment completed, the unique identifier for the user who completed the skill set assessment and the identifier for the network device; and for sending securely from server digital indicator processing application on the server network device the created expiration digital security identifier with the selected expiration digital indicator to the network device via the communications network for display on the network device, the selected expiration digital indicator indicating the level of skill set assessment completed has expired, and the created expiration digital security identifier preventing tampering of the created expiration digital security identifier with the selected expiration digital indicator indicating the level of skill set assessment completed has expired.

* * * * *